(12) United States Patent
Kakimoto

(10) Patent No.: US 8,498,188 B2
(45) Date of Patent: Jul. 30, 2013

(54) TARGET LEVEL SETTING METHOD FOR A SIGNAL USED IN MAXIMUM-LIKELIHOOD DECODING IN PRML PROCESSING OF A SIGNAL REPRODUCED FROM AN OPTICAL INFORMATION RECORDING MEDIUM, PLAYBACK DEVICE FOR AN OPTICAL INFORMATION RECORDING MEDIUM, AND TARGET LEVEL SETTING PROGRAM FOR A SIGNAL USED IN MAXIMUM-LIKELIHOOD DECODING IN PRML PROCESSING

(75) Inventor: Hiroya Kakimoto, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 107 days.

(21) Appl. No.: 12/919,719

(22) PCT Filed: Feb. 26, 2009

(86) PCT No.: PCT/JP2009/054109
§ 371 (c)(1),
(2), (4) Date: Aug. 26, 2010

(87) PCT Pub. No.: WO2009/107860
PCT Pub. Date: Sep. 3, 2009

(65) Prior Publication Data
US 2010/0329090 A1 Dec. 30, 2010

(30) Foreign Application Priority Data
Feb. 26, 2008 (JP) .................. 2008-044599

(51) Int. Cl.
*G11B 7/00* (2006.01)
(52) U.S. Cl.
USPC .................. 369/59.22; 369/47.18
(58) Field of Classification Search
USPC .............. 369/59.21, 59.22, 47.15, 47.18
See application file for complete search history.

(56) References Cited

U.S. PATENT DOCUMENTS 5,668,679 A * 9/1997 Swearingen et al. ........... 360/75
6,288,992 B1 * 9/2001 Okumura et al. ............ 369/47.5
(Continued)

FOREIGN PATENT DOCUMENTS

EP  1 174 877 A2  1/2002
JP  4335260 A  11/1992
(Continued)

OTHER PUBLICATIONS

Korean Office Action dated Jun. 29, 2012, in a counterpart Korean patent application No. 10-2010-7018980.
(Continued)

*Primary Examiner* — Thomas Alunkal
(74) *Attorney, Agent, or Firm* — Chen Yoshimura LLP

(57) ABSTRACT

Target levels in the PRML method are adaptively set under conditions of simplicity and a low cost. A method of setting a target level for reproduction of an optical information recording medium includes: a step of producing a reproduction signal from reflected light of laser light irradiated to an optical information recording medium; a step of performing waveform equalization processing, which depends on a predetermined partial response characteristic, on the reproduction signal to produce a waveform-equalized reproduction signal; a step of detecting peak levels for marks and spaces of a predetermined number of symbols from the waveform-equalized reproduction signal irrespective of a condition for a symbol adjoining each symbol; and a setting step of determining and setting values of a plurality of target levels, which is employed in Viterbi decoding and is arrayed with non-equal intervals among them, on the basis of a relative relationship among the detected peak levels.

14 Claims, 18 Drawing Sheets

U.S. PATENT DOCUMENTS

| | | | |
|---|---|---|---|
| 2001/0055169 A1* | 12/2001 | Noda et al. .................. 360/25 |
| 2002/0013927 A1 | 1/2002 | Hayami et al. |
| 2002/0145956 A1* | 10/2002 | Okumura et al. .......... 369/47.5 |
| 2003/0137912 A1* | 7/2003 | Ogura ...................... 369/47.39 |
| 2005/0180298 A1* | 8/2005 | Horibe et al. ............. 369/124.1 |
| 2006/0280240 A1 | 12/2006 | Kikugawa et al. |
| 2007/0234188 A1 | 10/2007 | Shiraishi |
| 2007/0237059 A1* | 10/2007 | Kasahara ................. 369/124.1 |
| 2007/0286048 A1* | 12/2007 | Hayashi .................... 369/59.22 |
| 2008/0112288 A1 | 5/2008 | Miyashita et al. |
| 2008/0151726 A1* | 6/2008 | Yamakawa et al. ....... 369/59.22 |

FOREIGN PATENT DOCUMENTS

| | | |
|---|---|---|
| JP | H09-320206 A | 12/1997 |
| JP | H10-308066 A | 11/1998 |
| JP | H11-283336 A | 10/1999 |
| JP | 2005-267759 A | 9/2005 |
| JP | 2006-286037 A | 10/2006 |
| JP | 2006-286073 A | 10/2006 |
| JP | 2006-344294 A | 12/2006 |
| WO | 2006/049006 A1 | 5/2006 |

OTHER PUBLICATIONS

International Search Report (ISR) issued in PCT/JP2009/054109 (parent application) mailed in Jul. 2009 for Examiner consideration.

Written Opinion (PCT/ISA/237) issued in PCT/JP2009/054109 (parent application) mailed in Jul. 2009.

Ide, "Adaptive Partial-Response Maximum-Likelihood Detection in Optical Recording Media," 2002 International Symposium on Optical Data Topical Meeting, Joint International Symposium Technical Digest, 2002, Cat. No. 02EX552, pp. 269-271.

Japanese Office Action dated Mar. 27, 2012, in a counterpart Japanese patent application No. 2008-044599.

European Search Report dated Mar. 8, 2013, in a counterpart European patent application No. 09714188.1.

* cited by examiner

PR(1,2,2,1)

| TARGET LEVEL | |
|---|---|
| REFERENCE VALUE | ADJUSTED |
| 6 | 6 |
| 5 | 4.493 |
| 4 | 3.811 |
| 3 | 3.058 |
| 2 | 2.305 |
| 1 | 1.444 |
| 0 | 0 |

RESULTS OF DETECTION OF REPRODUCTION SIGNAL

| TARGET LEVEL ||
| REFERENCE VALUE | ADJUSTED |
|---|---|
| 6 | 6 |
| 5 | 4.364 |
| 4 | 3.481 |
| 3 | 2.934 |
| 2 | 2.387 |
| 1 | 1.528 |
| 0 | 0 |

RESULTS OF DETECTION OF REPRODUCTION SIGNAL

| TARGET LEVEL | |
|---|---|
| REFERENCE VALUE | ADJUSTED |
| 6 | 6 |
| 5 | 4.222 |
| 4 | 3.511 |
| 3 | 2.858 |
| 2 | 2.205 |
| 1 | 1.570 |
| 0 | 0 |

TARGET LEVEL SETTING METHOD FOR A SIGNAL USED IN MAXIMUM-LIKELIHOOD DECODING IN PRML PROCESSING OF A SIGNAL REPRODUCED FROM AN OPTICAL INFORMATION RECORDING MEDIUM, PLAYBACK DEVICE FOR AN OPTICAL INFORMATION RECORDING MEDIUM, AND TARGET LEVEL SETTING PROGRAM FOR A SIGNAL USED IN MAXIMUM-LIKELIHOOD DECODING IN PRML PROCESSING

TECHNICAL FIELD

The present invention relates to a PRML processing technology for a reproduction signal in information recorded in an optical information recording medium.

BACKGROUND ART

In recent years, high-density long-term recording of a digital image or the like has come to be performed along with the advent of high-definition television. As an optical information recording medium meeting the request, an optical information recording medium (hereinafter, an optical disk) such as a write-once hard-disk digital versatile disc (hereinafter, an HD DVD-R) or a write-once Blu-ray disc (hereinafter, a BD-R) has been developed. The optical disk has a structure having a recording layer, a reflective layer, and a protective layer formed on one principal side of an optical transparency disk substrate. In one side of the substrate on which the recording layer and reflective layer are formed, a spiral groove or concentric grooves that is called a groove is formed, and in-between adjoining grooves is formed as a convex part called a land. In such an optical disk, recording is achieved by irradiating recording laser light to the recording layer in the groove while tracking along the groove by means of an optical disk recording reproduction device, and thus forming pits (hereinafter called "marks") so that they can be replaced with symbols. Reproduction is achieved by irradiating a laser beam for reproduction to the length nT of the mark (T denotes the length of a bit between reference channel clocks and nT denotes a length that is an n integral multiple) and length nT of a portion between such marks (hereinafter, a space) and an array of marks and spaces, thereby converting reflected light into symbols of a reproduction signal.

As for such optical disks, a high-density recording type optical disk system was constructed under the HD DVD standard or Blu-ray disc standard (hereinafter BD standard). What is important in the high-density recording technologies are requested to attain a large recording capacity and a high signal-processing speed. By meeting the requests, an unprecedented problem has arisen. That is, a problem of a signal-to-noise ratio or inter-symbol interference. The issue is attributable to the fact that when recorded pits are read by an optical head, the beam diameter of reading laser light is larger than the size of an isolated pit. What brought in order to solve the problem is a signal processing method suitable for reproduction of high-density recording information and referred to as partial response maximum likelihood (hereinafter, PRML) decoding. The PRML method is a method of a combination of a partial response (PR) characteristic, which is a reproduction technology assuming presence of inter-symbol interference as a precondition, and maximum likelihood (ML) decoding which selectively decodes the most likely signal sequence out of a reproduction signal. Further, the PRML method is to reproduce a signal using the amplitude energies of the signal at adjoining channel clock positions without performing forcible waveform equalization so as to remove inter-symbol interference. In relation to the technology of the PRML method, various arts for processing a correction quantity of a reproduction signal on the basis of an evaluation value of the reproduction signal according to a waveform in a transmission channel have been proposed in order to reduce an error occurring during decoding processing of data.

The first proposed art is a method of decreasing a symbol error rate by extending control during equalization of a reproduction signal dependent on a PR characteristic. The second proposed art is a method of decreasing the error rate by controlling a reference signal for maximum likelihood decoding. Since the present invention relates to the latter invention, typical examples will be presented below.

For example, Japanese Patent No. 3033238 describes an invention that notes a non-linear distortion which is one form of inter-symbol interference and occurs during reading of recording pits, statistically obtains a predictive sample value from a decoded signal sequence which is outputted from a maximum likelihood decoding circuit, updates the sample value according to a change in the non-linear distortion, and feeds back the control signal to the maximum likelihood decoding circuit so as to thus achieve maximum likelihood decoding.

JP-A-2005-267759 describes an invention that detects only peak levels and bottom levels of a reproduction equalization signal for a shortest symbol (3T) and a longest symbol (11T) respectively of record bits of the signal, allocates levels as Viterbi expectation values to symbols (2T to 11T) for calculation, feeds the signal to a maximum likelihood decoding circuit so as to thus perform branch metric operation.

A thesis in the IEEE 2002 "Adaptive PRML Detection in Optical Recording Media" describes a system that allows an output signal of a Viterbi detection circuit to pass through a wave divider, and feeds a signal of a reference level to a Viterbi detector using an adaptive table. The adaptive table is a reference table as sociated with each of ten binary signals.

Patent document 1: Japanese Patent No. 3033238
Patent document 2: JP-A-2005-267759
Non-patent document 1: "Adaptive Partial-Response Maximum-Likelihood Detection in Optical Recording Media" (Conference title: 2002 International Symposium on Optical Data Topical Meeting, Joint International Symposium Technical Digest (Cat. No. 02EX552), p. 269-271)

SUMMARY OF THE INVENTION

Problems to be Solved by the Invention

The arts described in the foregoing patent documents and non-patent document have the advantage that an error can be reduced using a relatively small-scale operation circuit instead of a large-scale operation circuit in which an arithmetic operation needs to be performed on each impulse response sequence at a channel clock position of a record bit that is subjected to signal control.

However, when a symbol whose appearance frequency is the highest in a signal sequence and which is most likely to cause an error, for example a 2T mark or a 2T space having a short code length, is concerned, the probability becomes the highest that reproduction may not be able to be performed because of a difference between an amplitude profile of a reproduction equalization signal (an amount of amplitude at a channel clock position) and target levels of a corrected control signal (hereinafter, called target levels), and a symbol error rate tends to rise.

The aforesaid known arts do not focus on symbols which exhibit high appearance frequencies and which are likely to cause an error. There are still problems to be solved from the viewpoint of improving system efficiency.

An object of the present invention is to provide a technology for adaptively setting target levels of a control signal, which is employed in maximum likelihood decoding of a reproduction equalization signal according to the PRML method, for respective symbols, which exhibit high appearance frequencies and are likely to cause an error, along a sequence of the reproduction equalization signal, and thus decreasing a symbol error rate.

Means for Solving the Problems

A method of setting a target level of a signal to be employed in maximum likelihood decoding in PRML processing of a reproduction signal of an optical information recording medium in accordance with a first aspect of the present invention includes:

a step of producing a reproduction signal from reflected light of laser light irradiated to an optical information recording medium;

a step of performing waveform equalization processing, which depends on a predetermined partial response characteristic, on the reproduction signal to produce a waveform-equalized reproduction equalization signal;

a step of detecting values of a peak level of the signal, which correspond to a mark and a space of a shortest symbol and a mark and a space of a symbol of 5T or more, respectively, from the reproduction equalization signal irrespective of a condition for a symbol adjoining the symbol;

a step of determining a value of a center level among all target levels of the signal to be employed in maximum likelihood decoding in accordance with a relative relationship among three values, said three values being, respective values of the peak levels of the signal corresponding to the mark and space of the symbol of 5T or more, and a value of an intermediate level between the peak levels of the signal corresponding to the mark and space of the shortest symbol; and a setting step of setting the determined value of the center level.

A method of setting a target level of a signal to be employed in maximum likelihood decoding in PRML processing of a reproduction signal of an optical information recording medium in accordance with a second aspect of the present invention includes:

a step of producing a reproduction signal from reflected light of laser light irradiated to an optical information recording medium;

a step of performing waveform equalization processing, which depends on a predetermined partial response characteristic, on the reproduction signal to produce a waveform-equalized reproduction equalization signal;

a step of detecting values of peak levels of the signal, which correspond to a mark and a space of a shortest symbol and a mark and a space of a symbol of 5T or more, respectively, from the reproduction equalization signal irrespective of a condition for a symbol adjoining the symbol;

a determination step of determining a value of a level, which is the closest to a center level of target levels of the signal to be employed in maximum likelihood decoding and corresponds to the mark side, in accordance with a relative relationship among three values, said three values being, respective values of the peak level of the signal corresponding to the mark and space of the symbol of 5T or more, and the value of the peak level of the signal corresponding to the mark of the shortest symbol, and further determining a value of a level, which is the closest to the center level of the target levels of the signal to be employed in maximum likelihood decoding and corresponds to the space side, in accordance with a relative relationship among three values, said three values being, respective values of the peak level of the signal corresponding to the mark and space of the symbol of 5T or more, and the value of the peak level of the signal corresponding to the space of the shortest symbol; and a setting step of setting the determined values of the levels, respectively.

A method of setting target levels of a signal to be employed in maximum likelihood decoding in PRML processing of a reproduction signal of an optical information recording medium in accordance with a third aspect of the present invention includes:

a step of producing a reproduction signal from reflected light of laser light irradiated to an optical information recording medium;

a step of performing waveform equalization processing, which depends on a predetermined partial response characteristic, on the reproduction signal to produce a waveform-equalized reproduction equalization signal;

a step of detecting values of peak levels of the signal, which correspond to a mark and a space of a symbol that is the shortest next to a shortest symbol and a mark and space of a symbol of 5T (where T denotes a standard length) or more, from the reproduction equalization signal irrespective of a condition for a symbol adjoining the symbol;

a determination step of determining a value of a level, which is the second closest to a center level of target levels of the signal to be employed in maximum likelihood decoding and corresponds to the mark side, in accordance with a relative relationship among the respective values the peak levels of the signal corresponding to the mark and space of the symbol of 5T or more, and the value of the peak level of the signal corresponding to the mark of the symbol that is the shortest next to the shortest symbol, and further determining a value of a level, which is the second closest to the center level of the target levels of the signal to be employed in maximum likelihood decoding and corresponds to the space side, in accordance with a relative relationship of three values being, respective values of the peak levels of the signal corresponding to the mark and space of the symbol of 5T or more, and the value of the peak level of the signal corresponding to the space of the symbol that is the shortest next to the shortest symbol; and a setting step of setting the determined values of the levels, respectively.

A method of setting target levels of a signal to be employed in maximum likelihood decoding in PRML processing of a reproduction signal of an optical information recording medium in accordance with a fourth aspect of the present invention includes:

a step of producing a reproduction signal from reflected light of laser light irradiated to an optical information recording medium;

a step of performing waveform equalization processing, which depends on a predetermined partial response characteristic, on the reproduction signal to produce a waveform-equalized reproduction equalization signal;

a step of detecting values of peak levels of the signal, which correspond to a mark and a space of a third shortest symbol, respectively, and values of peak levels of the signal, which correspond to a mark and a space, respectively of a symbol of 5T or more, respectively, from the reproduction equalization signal irrespective of a condition for a symbol adjoining the symbol;

a step of determining a value of a level, which is the third closest to a center level of target levels of the signal to be employed in maximum likelihood decoding and corresponds to the mark side, in accordance with a relative relationships among three values, said three values being, respective values of the peak levels of the signal, which correspond to the mark and space of the symbol of 5T or more, and the value of the peak level of the signal corresponding to the mark of the third shortest symbol, and further determining a value of a level, which is the third closest to the center level of the target levels of the signal to be employed in maximum likelihood decoding and corresponds to the space side, in accordance with a relative relationship among three values, said three values being, respective values of the peak levels of the signal corresponding to the mark and space of the symbol of 5T or more, and the value of the peak level of the signal corresponding to the space of the third shortest symbol; and a setting step of setting the determined values of the levels, respectively.

Further, a method of setting target levels of a signal to be employed in maximum likelihood decoding in PRML processing of a reproduction signal of an optical information recording medium in accordance with a fifth aspect of the present invention includes:

a step of producing a reproduction signal from reflected light of laser light irradiated to an optical information recording medium;

a step of performing waveform equalization processing, which depends on a predetermined partial response characteristic, on the reproduction signal to produce a waveform-equalized reproduction equalization signal;

a step of detecting values of peak levels for marks and spaces of a shortest symbol, a symbol that is the shortest next to the shortest symbol, a third shortest symbol, and a symbol of 5T or more, respectively, from the reproduction equalization signal irrespective of a condition for a symbol adjoining each of the symbols;

a step of determining a value of a center level among all target levels of the signal, which are employed in discrimination control of Viterbi decoding, in accordance with a relative relationship among three values, said three values being, respective values of the peak levels of the signal corresponding to the mark and space of the symbol of 5T or more, and a value of an intermediate level between the peak levels of the signal corresponding to the mark and space of the shortest symbol;

a determination step of determining a value of a level, which is the closest to the center level and corresponds to the mark side, in accordance with a relative relationship among three values, said three values being, respective values of the peak levels of the signal corresponding to the mark and space of the symbol of 5T or more, and the value of the peak level of the signal corresponding to the mark of the shortest symbol, and further determining a value of a level, which is the closest to the center level and corresponds to the space side, in accordance with a relative relationship among three values, said three values being, respective values of the peak levels of the signal corresponding to the mark and space of the symbol of 5T or more, and the value of the peak level of the signal corresponding to the space of the shortest symbol;

a determination step of determining a value of a level, which is the second closest to the center level and corresponds to the mark side, in accordance with a relative relationships among the values of the respective peak levels of the signal corresponding to the mark and space of the symbol of 5T or more, and the value of the peak level of the signal corresponding to the mark of the symbol that is the shortest next to the shortest symbol, and further determining a value of a level, which is the second closest to the center level and corresponds to the space side, in accordance with a relative relationship among three values, said three values being, respective values of the peak levels of the signal corresponding to the mark and space of the symbol of 5T or more, and the value of the peak level of the signal corresponding to the space of the symbol that is the shortest next to the shortest symbol; and a determination step of determining a value of a level, which is the third closest to the center level and corresponds to the mark side, in accordance with a relative relationship among three values, said three values being, respective values of the peak levels of the signal corresponding to the mark and space of the symbol of 5T or more, and the value of the peak level of the signal corresponding to the mark of the third shortest symbol, and further determining a value of a level, which is the third closest to the center level and corresponds to the space side, in accordance with a relative relationship among three values, said three values being, respective values of the peak levels of the signal corresponding to the mark and space of the symbol of 5T or more, and the value of the peak level of the signal corresponding to the space of the third shortest symbol.

As a sixth aspect, although the symbol of 5T or more in the methods of setting target levels of a signal to be employed in maximum likelihood decoding in PRML processing of a reproduction signal of an optical information recording medium in accordance with the first to fifth embodiments may be replaced with at least one of two symbols that have lengths which are twice or more larger than that of the shortest symbol, and that exhibit the highest probabilities of occurrence relative to a code length causing an amount of amplitude of the signal to reach a saturated state.

The foregoing processing is needed in a method of setting targets in a case where the shortest symbol is 1T long in order to attain a large capacity stipulated in other than the BD standard or HD DVD standard, or in a setting method required in a case where the amplitude level of a signal is 6T or more.

As mentioned above, since target levels can be readily calculated from peak levels of a signal corresponding to predetermined symbols, the aforesaid method can be readily implemented in a reproduction device for an optical information recording medium. In addition, decrease of a symbol error rate can be achieved with a relatively low cost.

Generally, the aforesaid peak level is a mean value of plural peak values of a reproduction equalization signal being waveform-equalized relative to the marks or spaces of identical symbols. Other statistical values, for example, a mode may be adopted.

Further, when decoding processing is performed using, for example, a partial response (1,2,2,1) employed under the BD standard, the aforesaid target levels are seven levels of non-equal intervals ranging from a minimum value of 0 to a maximum value of 6. When decoding processing is performed using, for example, a partial response (1,2,2,2,1) employed under the HD DVD standard, the target levels are nine levels of non-equal intervals ranging from a minimum value of 0 to a maximum value of 8.

Further, the aforesaid setting step may be performed before information recorded in an optical information recording medium is reproduced or after part of the information recorded in the optical information recording medium is reproduced. In the former case, the setting step is performed in, for example, a stage preceding reproduction of data from an area in which system data is recorded. In the latter case, when the setting step is performed in course of reproduction, setting can be achieved depending on the state of the optical information recording medium.

In addition, the aforesaid setting step may be regularly performed during reproduction of information recorded in an optical information recording medium. In this case, optimal target levels can be set all the time.

Further, the aforesaid setting step may be performed in a case where a signal state falls outside a permissible range during reproduction of information recorded in an optical information recording medium. In this case, the setting step can be performed whenever it becomes necessary.

Further, a step of registering level values, which are set at the setting step, together with an ID of an optical information recording medium in a memory in a device having a reproduction function for an optical information recording medium, a step of reading an ID from another optical information recording medium, a step of setting the level values registered in the memory in association with the ID read from the another optical information recording medium may be included. In this case, when information is reproduced from a same kind of optical information recording medium, the reproduction can be performed using appropriate target levels from the beginning.

The method of setting target levels of a signal to be employed in maximum likelihood decoding in PRML processing of a reproduction signal of an optical information recording medium in accordance with the fifth aspect of the present invention includes: a step of reading values of plural target level employed in maximum likelihood decoding and arrayed with non-equal intervals among them, that is, values of levels that form target levels and are obtained according to the first to fourth aspects in accordance with a relative relationship among values of peak levels of a signal corresponding to marks and spaces of a shortest symbol, a symbol that is the shortest next to the shortest symbol, a third shortest symbol, and a symbol of 5T or more; and a step of setting the read values of the target levels in a processing unit, which performs maximum likelihood decoding, prior to reproduction of information recorded in an optical information recording medium. Thus, once plural target levels to be employed in maximum likelihood decoding are prepared for each optical information recording medium, reproduction can be performed with a symbol error rate held low from the beginning.

In addition, a processor for an optical information recording medium in which the target level setting method in accordance with any of the aforesaid first to sixth embodiments, that is, a reproduction device or a recording and reproducing device can be produced according to each of the aspects.

Further, the method of setting target levels in accordance with any of the first to sixth aspects may be provided as a target level setting program causing a processor to perform steps according to each of the aspects.

For example, the fifth embodiment may be provided as a target level setting program causing a processor to perform: a step of producing a reproduction signal from reflected light of laser light irradiated to an optical information recording medium;

a step of performing waveform equalization processing, which depends on a predetermined partial response characteristic, on the reproduction signal to produce a waveform-equalized reproduction equalization signal;

a step of detecting values of peak levels of the signal, which correspond to marks and spaces of a shortest symbol, a symbol that is the shortest next to the shortest symbol, a third shortest symbol, and a symbol of 5T or more, respectively, from the reproduction equalization signal irrespective of a condition for a symbol adjoining each of the symbols;

a step of determining a value of a center level among target levels of the signal, which are employed in maximum likelihood decoding, in accordance with a relative relationship among three values, said three values being, respective values of the peak levels of the signal corresponding to the mark and space of the symbol of 5T or more, and a value of an intermediate level between the peak levels of the signal corresponding to the mark and space of the shortest symbol;

a determination step of determining a value of a level, which is the closest to the center level and corresponds to the mark side, in accordance with a relative relationship among three values, said three values being, respective values of the peak levels of the signal corresponding to the mark and space of the symbol of 5T or more, and the value of the peak level of the signal corresponding to the mark of the shortest symbol, and further determining a value of a level, which is the closest to the center level and corresponds to the space side, in accordance with a relative relationship among three values, said three values being, respective values of the peak levels of the signal corresponding to the mark and space of the symbol of 5T or more, and the value of the peak level of the signal corresponding to the space of the shortest symbol;

a determination step of determining a value of a level, which is the second closest to the center level and corresponds to the mark side, in accordance with a relative relationship among the values of the peak levels of the signal corresponding to the mark and space of the symbol of 5T or more, and the value of the peak level of the signal corresponding to the mark of the symbol that is the shortest next to the shortest symbol, and further determining a value of a level, which is the second closest to the center level and corresponds to the space side, in accordance with a relative relationship among three values, said three values being, respective values of the peak levels of the signal corresponding to the mark and space of the symbol of 5T or more, and the value of the peak level of the signal corresponding to the space of the symbol that is the shortest next to the shortest symbol; and a determination step of determining a value of a level, which is the third closest to the center level and corresponds to the mark side, in accordance with a relative relationship among three values, said three values being, respective values of the peak levels of the signal corresponding to the mark and space of the symbol of 5T or more, and the value of the peak level of the signal corresponding to the mark of the third shortest symbol, and further determining a value of a level, which is the third closest to the center level and corresponds to the space side, in accordance with a relative relationship among three values, said three values being, respective values of the peak levels of the signal corresponding to the mark and space of the symbol of 5T or more, and the value of the peak level of the signal corresponding to the space of the third shortest symbol.

A program causing a processor to perform at least a part of the steps of the method of setting target levels in accordance with the present invention can be created. The program is stored in, for example, an optical disk such as a flexible disk or a CD-ROM, a recording medium or storage device such as a magneto-optical disk, a semiconductor memory, or a hard disk, or a nonvolatile memory of a processor. Otherwise, the program may be distributed by a digital signal over a network. In addition, data being processed is temporarily preserved in the storage device such as the memory of the processor.

Advantage of the Invention

According to the present invention, there is provided a technology capable of reducing an error in a reproduction signal by noting symbols, which are likely to cause an error and exhibit high appearance frequencies, during maximum likelihood decoding of a PRML method in a reproduction system for an optical information recording medium.

BRIEF DESCRIPTION OF THE DRAWINGS

FIG. 4 includes explanatory diagrams concerning target levels of a signal to be employed in Viterbi decoding of example 1.

FIG. 5 includes explanatory diagrams of target levels of a signal to be employed in Viterbi decoding of example 2.

FIG. 6 includes explanatory diagrams of target levels of a signal to be employed in Viterbi decoding of example 3.

DESCRIPTION OF REFERENCE NUMERALS

1: optical unit (PU), 3: pre-equalizer (Pre-EQ), 5: ADC, 7: equalizer, 9: Viterbi decoder, 11: control unit, 13: recording waveform production unit, 15: optical information recording medium, 17: memory, 111: symbol discrimination block, 113: detection instruction block, 115: detection block, 117: operation block, 119: characteristic value detection block.

MODE FOR CARRYING OUT THE INVENTION

Embodiment of the Present Invention

Figure 1:
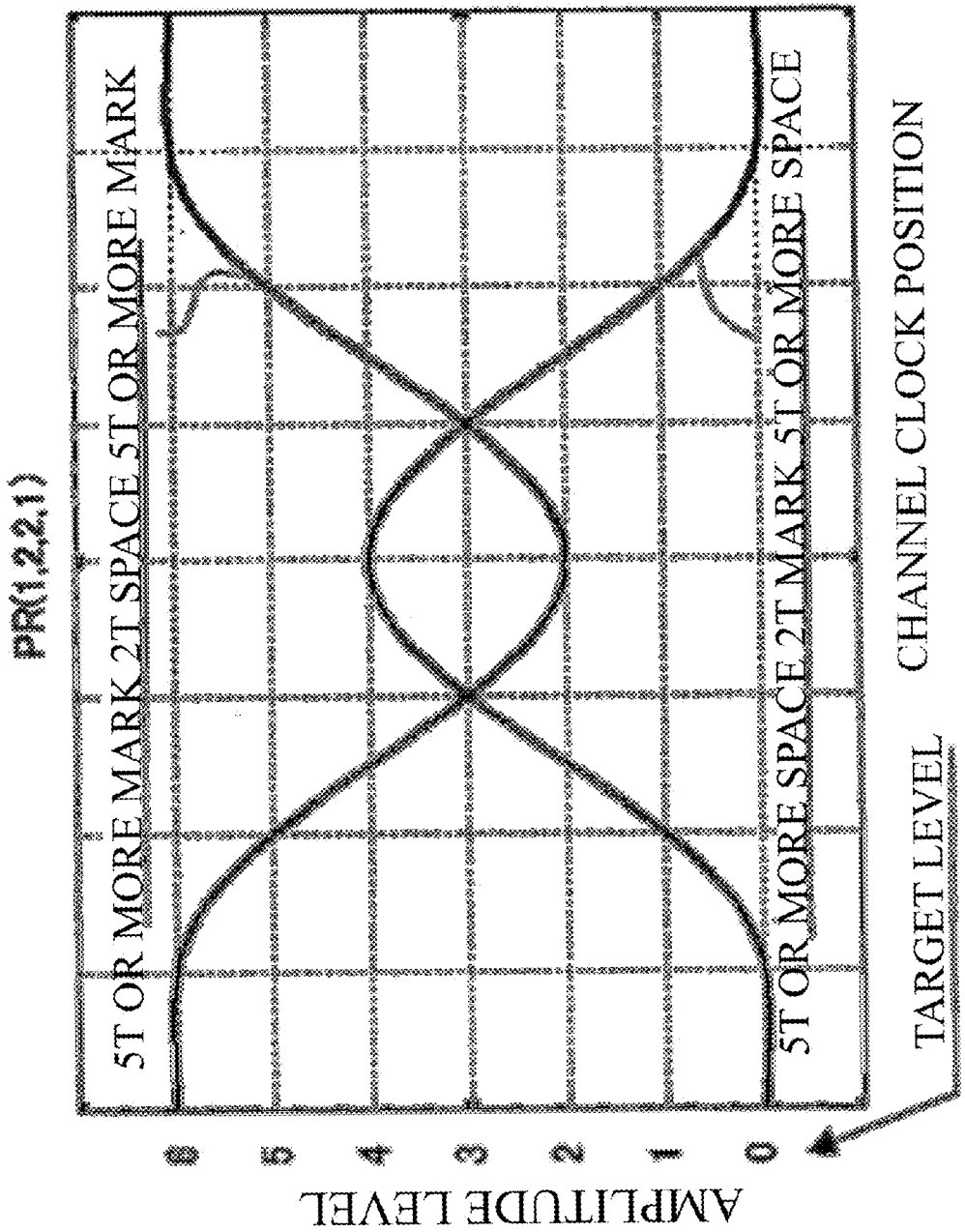
FIG. 1 is a diagram for explaining values of target levels of a signal to be employed in typical maximum likelihood decoding.

To begin with, referring to FIG. 1, a description will be made of target levels of an amplitude profile of a reproduction equalization signal for maximum likelihood decoding to be performed using a PR(1,2,2,1) adopted under, for example, the BD standard, or especially, for typical maximum likelihood (Viterbi) decoding. FIG. 1 shows symmetric signals of a 5T or more space, a 2T mark, and a 5T or more space and of a 5T or more mark, a 2T space, and a 5T or more mark. As shown in the drawing, values of target levels of respective amplitude levels for maximum likelihood decoding to be performed using the PR(1,2,2,1) are levels at seven steps ranging from 0 to 6. As for the level values at channel clock positions, a value of a minimum level that is a value of a peak level of an amplitude level corresponding to a mark is 0, a value of a maximum level that is a value of a peak level of an amplitude level corresponding to a space is 6, a value of a center level between 0 and 6 is 3, a value of a higher level that is the closest to the center level is 4, and a value of a lower level that is the closest to the center level is 2. A value of a higher level that is the second closest to the center level is 5, and a value of a lower level that is the second closest thereto is 1. In the past, intervals among the level values of the target levels have been, as shown in FIG. 1, equal and fixed. Based on the target levels, symbols represented by a waveform-equalized reproduction equalization signal are identified.

Figure 2:
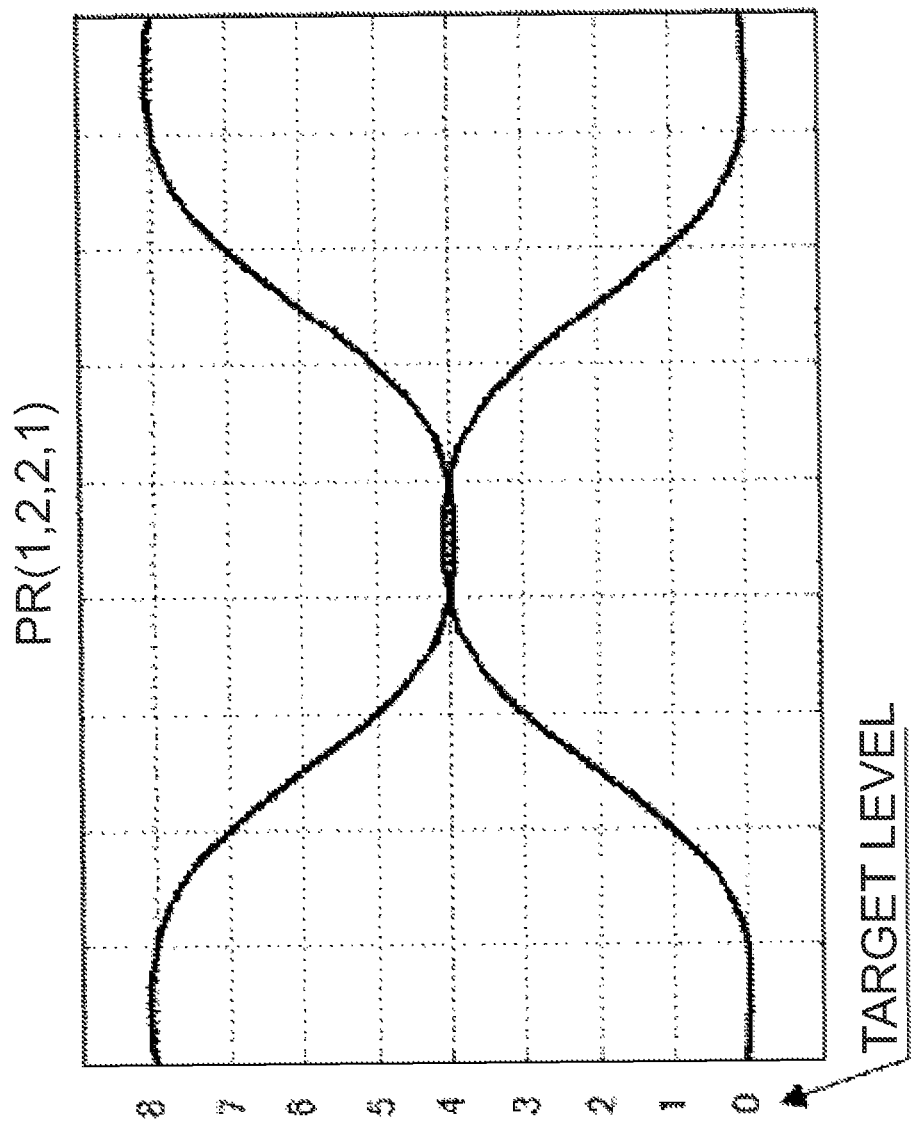
FIG. 2 is a diagram for explaining the target levels of a signal to be employed in typical maximum likelihood decoding.

Referring to FIG. 2, a description will be made of target levels of an amplitude profile of a reproduction equalization signal corresponding to recording pits to be employed in maximum likelihood decoding to be performed using a PR(1, 2,2,2,1), which is adopted under, for example, the HD DVD standard, that is, in maximum likelihood (Viterbi) decoding. FIG. 2 shows symmetric signals representing, similarly to those in FIG. 1, a 5T or more space, a 2T mark, and a 5T or more space, and a 5T or more mark, a 2T space, and a 5T or more mark. As shown in the drawing, target level values for maximum likelihood decoding to be performed using the PR(1,2,2,2,1) characteristic are levels at nine steps ranging from 0 to 8. As for the level values at channel clock positions, a value of a minimum level that is a value of a peak level of an amplitude level corresponding to a mark side is 0, a value of a maximum level that is a value of a peak level of an amplitude level corresponding to a space side is 8, a value of a center level between 0 and 8 is 4, a value of a higher level that is the closest to the center level is 5, and a value of a lower level that is the closest thereto is 3. In addition, a value of a higher level that is the second closest to the center level is 6, and a lower level that is the second closest thereto is 2. Further, a value of a higher level that is the third closest to the center level is 7, and a lower level value that is the third closest thereto is 1. Thus, in an ongoing system, as shown in FIG. 2, intervals among the values of the levels of target levels are equal and fixed. Based on the target levels, symbols represented by a waveform-equalized reproduction equalization signal are identified.

In the embodiment of the present invention, target levels of a signal to be employed in maximum likelihood (Viterbi) decoding are dynamically varied depending on the state of, for example, a waveform-equalized reproduction equalization signal, whereby a symbol error rate in reproduction is decreased, and information is stably reproduced from an optical information recording medium.

Under the foregoing precondition, referring to FIG. 3 to FIG. 5, a method for dynamically setting target levels to be employed in maximum likelihood decoding for controlling a signal will be described in particular.

First, laser light is irradiated to an optical information recording medium to be reproduced, and reflected light from the optical information recording medium is received and converted into an electric signal. Thereafter, a reproduction signal is produced by converting the electric signal into a digital signal (step S1 in FIG. 3). Waveform equalization processing dependent on a PR characteristic is performed on the produced reproduction signal (step S3). Symbol discrimination is performed on a waveform-equalized reproduction equalization signal in order to detect peak levels of the reproduction equalization signal (step S5).

More particularly, in a case where the foregoing method is applied to the BD standard, a mean value of peak level values of an amplitude profile of a reproduction equalization signal corresponding to a mark and a space of a shortest symbol, a mean value of values of peak levels of the amplitude profile of the reproduction equalization signal corresponding to a mark and a space of a symbol that is the shortest next to the shortest symbol, a mean value of values of peak levels on the amplitude profile of the reproduction equalization signal corresponding to a mark and a space of a third shortest symbol, a mean value of values of peak levels on the amplitude profile of the reproduction equalization signal corresponding to a mark and a space of at least one of two symbols that have a length which is twice or more larger than that of the shortest symbol and that exhibit the highest appearance probabilities relative to a code length causing an amount of amplitude of the signal to reach a saturated state, and a mean value of values of peak levels on the amplitude profile of the reproduction equalization signal corresponding to a mark and a space of a symbol of 5T or more are detected as peak levels for the respective symbols.

In addition, an expression reading "peak levels in the amplitude profile of the reproduction equalization signal corresponding to a mark and a space of a symbol, respectively" may be abbreviated simply to "peak levels for a mark and a space of a symbol" or "peak levels of the signal corresponding to a mark and a space of a symbol, respectively" while having the same meaning.

As for away of obtaining the foregoing mean value, among reproduction signals reproduced from a total of approximately ten thousand pairs of a mark and a space in consideration of reliability, an appearance number of a signal is measured in relation to each pit. The signals are classified into signals representing to 2T to 9T, respectively. The peak levels of respective reproduction equalization signals are sorted by a symbol of a corresponding mark and space, and then summated. The sum resulting from the summation is divided by the appearance number. The thus obtained mean value is a highly reliable numerical value. When the mean value is described hereinafter, the mean value is a value obtained through the same calculation as the above one.

When ten thousand recording pits recorded in a BD-R are sampled, the appearance probabilities of nT marks are often as mentioned below.

The appearance probability of a 2T mark is approximately 40%, that of a 3T mark is approximately 25%, that of a 4T mark is approximately 16%, that of a 5T mark is approximately 10%, that of a 6T mark is approximately 6%, that of a 7T mark is approximately 3%, that of a 8T mark is 2% or less, and that of a 9T mark is 1% or less.

In the case of the HD DVD standard, a mean value of values of peak levels of a signal corresponding to a mark and a space of a shortest symbol, a mean value of values of peak levels of the signal corresponding to a mark and a space of a symbol that is the shortest next to the shortest symbol, a mean value of values of peak levels of the signal corresponding to a mark and a space of a third shortest symbol, respectively, a mean value of values of peak levels of the signal corresponding to a mark and a space, respectively, of at least one of two symbols that have a code length which is twice or more larger than that of the shortest symbol and that exhibit the highest appearance probabilities, and a mean value of values of peak levels of the signal corresponding to a mark and a space of a symbol of 5T or more are detected as the values of the peak levels for the respective symbols.

Based on the relative positional relationship among detected peak level values, target levels of a signal employed in maximum likelihood decoding are determined, and set in a processing unit that executes Viterbi decoding processing (step S7). The contents of the step will be described in particular below.

(1) Center level of all target levels of a signal employed in Viterbi decoding

In the case of the PR(1,2,2,1), the value of the center level is around 3.

In the case of the PR(1,2,2,2,1), the value of the center level is around 4.

A value A of a peak level corresponding to a mark of a symbol of 5T or more, and a value B of a peak level corresponding to a space thereof are detected. Thereafter, a value C of a peak level corresponding to a mark of a shortest symbol is detected. Concurrently, a value D of a peak level corresponding to a space of the shortest symbol is detected. A value E of an intermediate level between the values C and D is computed. A value calculated with a relative value computed from three values of the thus obtained values A, B, and E is set as the center level value.

Even when at least one of symbols that have a length which is twice or more larger than that of the shortest symbol and that exhibit the highest appearance probabilities relative to a code length causing an amount of amplitude of the signal to reach a saturated state is substituted for the symbol of 5T or more, the values of the peak levels of the signal corresponding to the mark and space thereof are assigned as the values A and B respectively similarly to the values of the peak levels of the signal corresponding to the symbol of 5T or more. The same applies to cases described below.

(2) Levels that are the closest to the center level and correspond to a 2T mark and a 2T space In the case of the PR(1,2,2,1), the values of the levels are around 2 and 4 respectively.

In the case of the PR(1,2,2,2,1), the values of the levels are around 3 and 5 respectively.

A value A of a peak level of a signal corresponding to a mark of a symbol of 5T or more and a value B of a peak level of the signal corresponding to a space thereof are detected. Thereafter, a value C of a peak level of the signal corresponding to a mark of a shortest symbol is detected. Concurrently, a value D of a peak level of the signal corresponding to a space of the shortest symbol is detected. A value calculated with a relative value computed from three values of the thus obtained values A, B, and C is regarded as a value of a level that is the closest to the center level of target levels to be employed in Viterbi decoding and that corresponds to a mark side. At the same time, a value calculated with a relative value computed from three values of the values A, B, and D is regarded and set as a value of a level that is the closest to the center level of the target levels to be employed in Viterbi decoding and that corresponds to a space side.

As for the relationship between a mark and a space, the polarities thereof are varied depending on a recording method (high-to-low or low-to-high). In the case of a high-to-low method, the peak level for the shortest symbol mark is used to determine a lower level, and the peak level for the shortest symbol space is used to determine a higher level. In the case of a low-to-high method, the levels are determined oppositely. The same is applicable for the relationship between a mark and a space depending on the recording method, hereinafter. In the present invention, a case where the low-to-high method is adopted will be described. Therefore, a description of the case of the high-to-low method will be omitted, but the case can be interpreted by alternating the polarities.

(3) Levels that are the second closest to the center level of target levels and correspond to a 3T mark and a 3T space In the case of the PR(1,2,2,1), the values of the levels are around 1 and 5 respectively.

In the case of the PR(1,2,2,2,1) characteristic, the values of the levels are around 2 and 6 respectively.

A value A of a peak level of a signal corresponding to a mark of a symbol of 5T or more and a value B of a peak level of the signal corresponding to a space thereof are detected. Thereafter, a value F of peak level of the signal corresponding to a mark of a symbol that is the shortest next to a shortest symbol is detected. Concurrently, a value G of a peak level of the signal corresponding to a space of the symbol that is the shortest next to the shortest symbol is detected. A value calculated with a relative value computed from three values of the thus obtained values A, B, and F is regarded as a value of a level that is the second closest to the center level of target levels to be employed in Viterbi decoding and that corresponds to the mark side. At the same time, a value calculated with a relative value computed from three values of the values A, B, and G is regarded and set as a value of a level that is the second closest to the center level of the target levels to be employed in Viterbi decoding and that corresponds to the space side.

(4) Levels that are the third closest to the center level of target levels and correspond to a 4T mark and a 4T space In the case of the PR(1,2,2,1) characteristic, the values of the levels are around 0 and 6 respectively.

In the case of the PR(1,2,2,2,1) characteristic, the values of the levels are normally around 1 and 7 respectively.

A value A of a peak level of a signal corresponding to a mark of a symbol of 5T or more and a value B of a peak level of the signal corresponding to a space thereof are detected. Thereafter, a value H of a peak level of the signal corresponding to a mark of a symbol that is the third shortest from the shortest symbol is detected. At the same time, a value I of a peak level of the signal corresponding to a space of the symbol that is the third shortest from the shortest symbol is detected. A value calculated with a relative value computed from three values of the thus obtained values A, B, and H is regarded as a value of a level that is the third closest to the center level of target levels to be employed in Viterbi decoding and that corresponds to the mark side. At the same time, a value calculated with a relative value computed from three values of the values A, B, and I is regarded and set as a value of a level that is the third closest to the center level of the target levels to be employed in Viterbi decoding and that corresponds to the space side.

(5) Maximum level and minimum level of target levels

In the case of the PR(1,2,2,1) characteristic, values of levels of a signal corresponding to a symbol of 5T or more are 0 and 6. Therefore, levels corresponding to two symbols that have a length which is twice or more larger than that of a shortest symbol and that exhibit the highest appearance probabilities relative to a code length causing an amount of amplitude of the signal to reach a saturated state have nearly the same values as the levels corresponding to the symbol of 5T or more. In this case, whichever of the level values are employed, the result is the same.

In the case of the PR(1,2,2,2,1) characteristic, the values of the levels are 0 and 8.

The peak levels corresponding to a mark and a space of at least one of two symbols that exhibit the highest appearance probabilities among symbols having a code length which is twice or more larger than that of a shortest symbol are determined as a value of a maximum level and a value of a minimum level of target levels to be employed in Viterbi decoding. Whichever of the mark and space corresponds to the maximum level or minimum level is determined in the same manner as the aforesaid example according to the recording method.

The values of the peak levels calculated as mentioned above may not be used as target levels as they are, but values calculated by multiplying the peak level values by an appropriate coefficient may be adopted as the values of the target levels. In the case of the PR(1,2,2,1), either (4) or (5) may be adopted.

By performing the foregoing processing, target levels that are conventionally arrayed with equal intervals among them are arrayed with non-equal intervals among them through computation of relative values dependent on the actual states of peak levels.

Data items recorded in optical information recording media with recording powers of 2.8 mW, 3.4 mW, and 4.3 mW respectively were reproduced, and signals representing symbols of approximately ten thousand pairs of a mark and a space were sampled. A change in a PR error was experimentally compared between a case where the sampled signals were adjusted with target levels of the signals employed in Viterbi decoding according to a means of the present invention and a case where the sample signals were not adjusted. As the results of the experiment, concrete examples of setting target level values under the BD standard will be presented using FIGS. 4A and 4B, FIGS. 5A and 5B, and FIGS. 6A and 6B.

To begin with, an example of target levels for an optical information recording medium written with the recording power of 2.8 mW will be described in conjunction with FIGS. 4A and 4B. In the example shown in FIGS. 4A and 4B, level values of each symbol normalized with amounts of amplitude of a reproduction equalization signal corresponding to a space and a mark of a 6T symbol are shown. Incidentally, a low-to-high method is adopted as a recording method. Namely, the signal is adjusted to relative positions of target levels shown in FIG. 4B. As a target level on a side corresponding to a 6T space, a value of a peak level is set to 0. As a target level on a side corresponding to a 6T mark, a value of a peak level is set to 6.

Under the foregoing precondition, a relative value of an intermediate level between a peak level corresponding to a 2T mark and a peak level corresponding to a 2T space is a target level of 3.058 that is a center level, or a level deviated to a positive side by 0.058 from a value in an ordinate case.

A relative value of a peak level on a side corresponding to a 2T space is a target level of 2.305 or a level deviated to the positive side by 0.305 from the one in an ordinary case. A relative value of a peak level on a side corresponding to a 2T mark is a target level of 3.811 or a level deviated to a negative side by 0.189 from the one in the ordinary case.

A relative value of a peak level on a side corresponding to a 3T space is a target level of 1.444, or a level deviated to the positive side by 0.444 from the one in the ordinary case. A relative value of a peak level on a side corresponding to a 3T mark is a target value of 4.493 or a level deviated to the negative side by 0.507 from the one in the ordinary case.

In the case of a side corresponding to a 4T symbol, target levels are 0 and 6 identical to those for the symbol of 5T or more. By setting the target levels, a symbol error rate due to application of the present invention in comparison with a reference value, that is, a case where the present invention is not applied is, as shown in the left side of FIG. 7, decreased from approximately 0.161 to 0.083. The decrease percentage is 48%. Incidentally, the axis of ordinates of FIG. 7 indicates a PR error, and the axis of abscesses indicates a recording power used at the time of writing an optical information recording medium. Three recording powers for writing can be compared with one another.

Next, an example of target levels for an optical information recording medium written with the recording power of 3.4 mW will be described in conjunction with FIGS. 5A and 5B. A relative value of an intermediate value between a peak level corresponding to a 2T mark and a peak level corresponding to a 2T space is set as a target level of 2.934 that is a center level, or a level deviated to the negative side by 0.066 from the one in the ordinary case.

Further, a target level of a relative value of a peak level on a side corresponding to a 2T space is set to 2.387 or a level deviated to the positive side by 0.387 from the one in the ordinary case. A relative value of a peak level on a side corresponding to a 2T mark is set as a target level of 3.481 or a level deviated to the negative side by 0.519 from the one in the ordinary case.

A relative value of a peak level corresponding to a 3T space is set as a target level of 1.528 or a level deviated to the positive side by 0.528 from the one in the ordinary case. A relative value of a peak level on a side corresponding to a 3T mark is set as a target level of 4.364 or a level deviated to the negative side by 0.636 from the one in the ordinary case.

Figure 7:
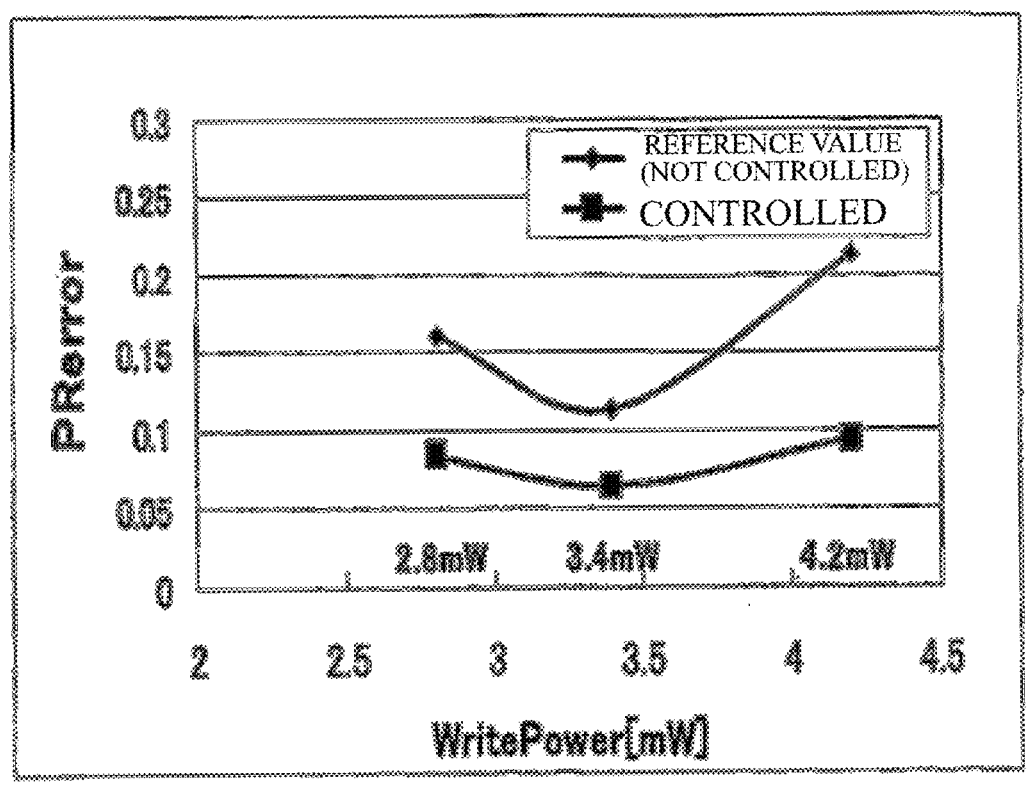
FIG. 7 is a diagram in which a change in a PR error due to a change in recording power is compared depending on whether target levels of a signal to be employed in Viterbi decoding of any of examples 1 to 3 are set or not.

In the case of a side corresponding to a 4T symbol, target levels are, similarly to those for the symbol of 5T or more, 0 and 6. By setting the target levels, a symbol error rate due to application of the present invention in comparison with a reference value shown in FIG. 1, that is, a case where the present invention is not applied is, as shown in the center of FIG. 7, decreased from approximately 0.115 to 0.065. The decrease percentage is 43%.

Next, an example of target levels for an optical information recording medium written with a recording power of 4.3 mW will be described in conjunction with FIGS. 6A and 6B. A relative value of an intermediate level between a peak level for a 2T mark and a peak level of a 2T space is set as a target level of 2.858 that is a center level, or a level deviated to the negative side by 0.142 from the one in the ordinary case.

Further, a relative value of a peak level on a side corresponding to a 2T space is set as a target level of 2.205, or a level deviated to the positive side by 0.205 from the one in the ordinary case. A relative value of a peak level on a side corresponding to a 2T mark is set as a target level of 3.511, or a level deviated to the negative side by 0.489 from the one in the ordinary case.

A relative value of a peak level on a side corresponding to a 3T space is set as a target level of 1.570, or a level deviated to the positive side by 0.570 from the one in the ordinary case.

A relative value of a peak level on a side corresponding to a 3T mark is set as a target level of 4.222, or a level deviated to the negative side by 0.778 from the one in the ordinary case.

In the case of a side corresponding to a 4T symbol, target levels are, similarly to those for the symbol of 5T or more, 0 and 6. By setting the target levels, a symbol error rate due to application of the present invention in comparison with a reference value, that is, a case where the present invention is not applied is, as shown in the right side of FIG. 7, decreased from approximately 0.215 to 0.094. The decrease percentage is 56%.

Figures 4A, 4B:
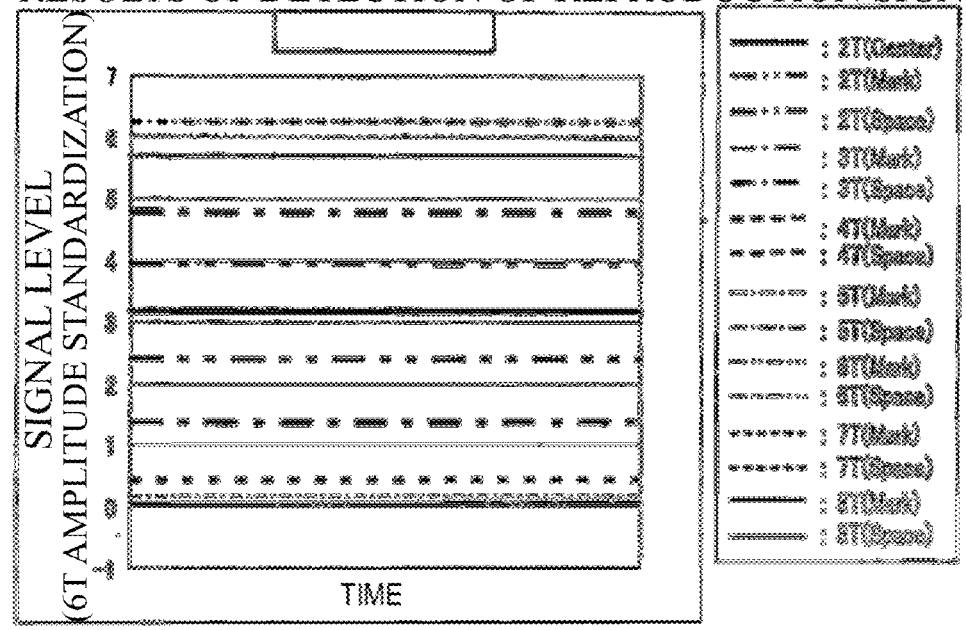
FIG. 4A is an explanatory diagram showing first target levels digitized based on the results of detection of a reproduction signal.
FIG. 4B is a diagram showing reference values for the target levels and a first example of calculations.
Figures 5A, 5B:
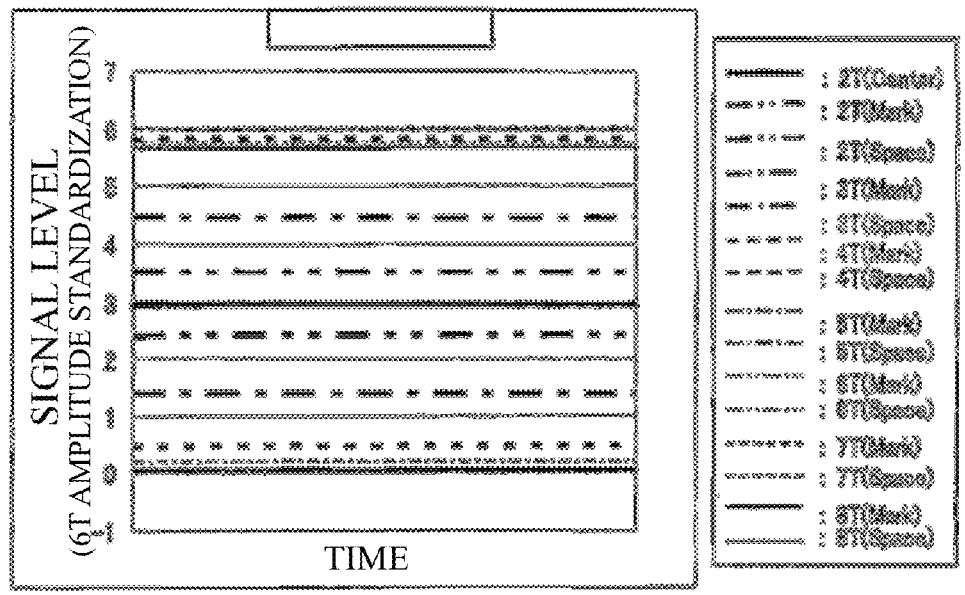
FIG. 5A is an explanatory diagram showing second target levels digitized based on the results of detection of a reproduction signal.
FIG. 5B is a diagram showing reference values of the target levels and a second example of calculations.
Figures 6A, 6B:
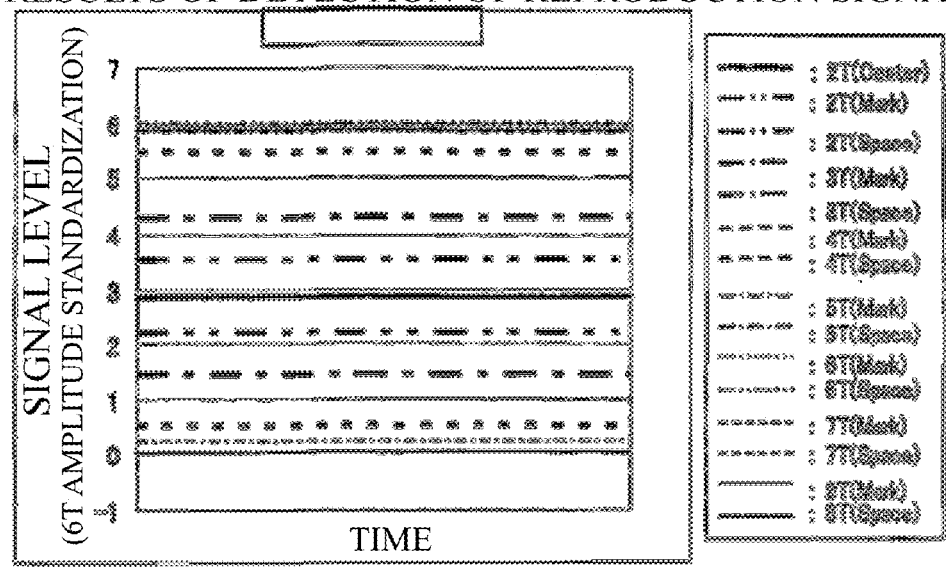
FIG. 6A is an explanatory diagram showing third target levels digitized based on the results of detection of a reproduction signal.
FIG. 6B is a diagram showing reference values of the target levels and a third example of calculations.

As mentioned above, the values of the target levels are as shown in FIG. 4B, FIG. 5B, or FIG. 6B, respectively. As shown in the drawings, although the target levels of 6 and 0 are fixed, the values of the other target levels are arrayed with non-equal intervals among them. The array of intervals is controlled according to a reproduction equalization signal in a stream of symbols ranging from 2T to 5T or more, and is adopted as the values of the target levels to be employed in Viterbi decoding. Thus, since level setting for small symbols that exhibit high appearance frequencies and are likely to cause an error are performed again, a symbol error rate can be efficiently decreased for reproduction succeeding that time point.

Specific Structure in Accordance with the Present Embodiment

Figure 8:
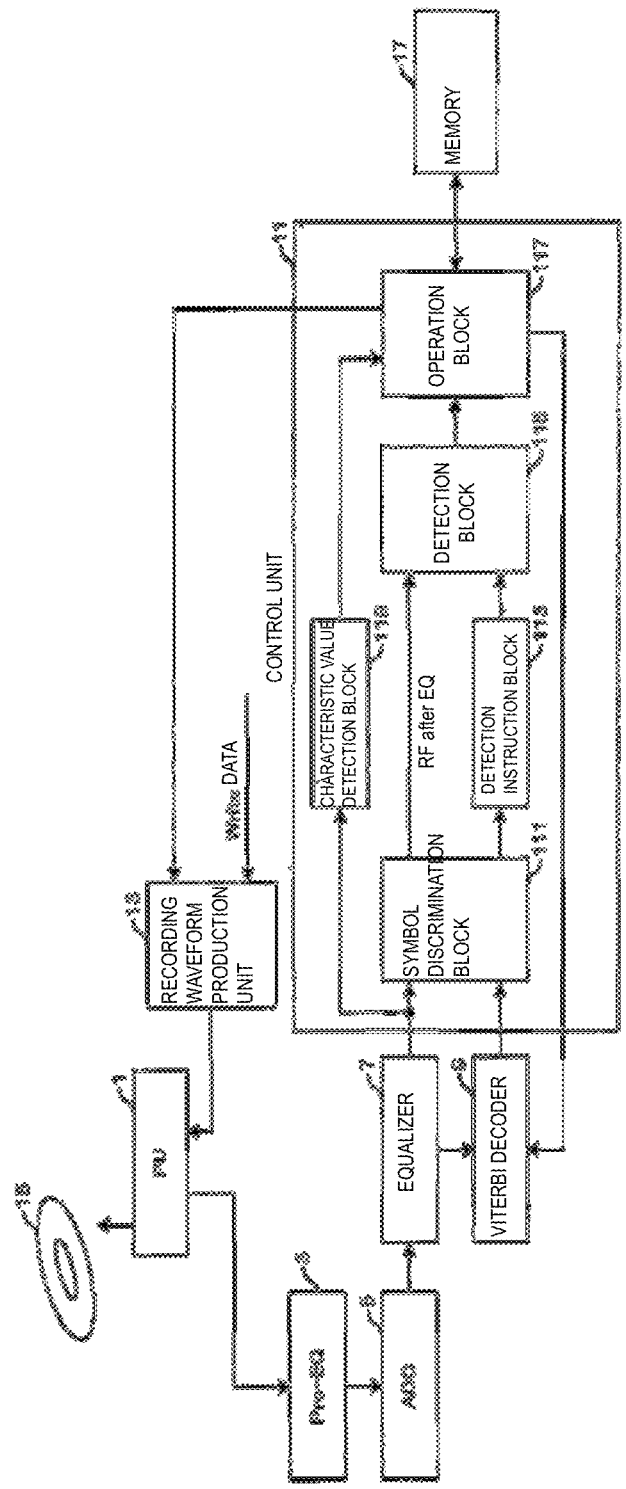
FIG. 8 is a functional block diagram of an optical recording and reproducing system in accordance with an embodiment of the present invention.
Figure 9:
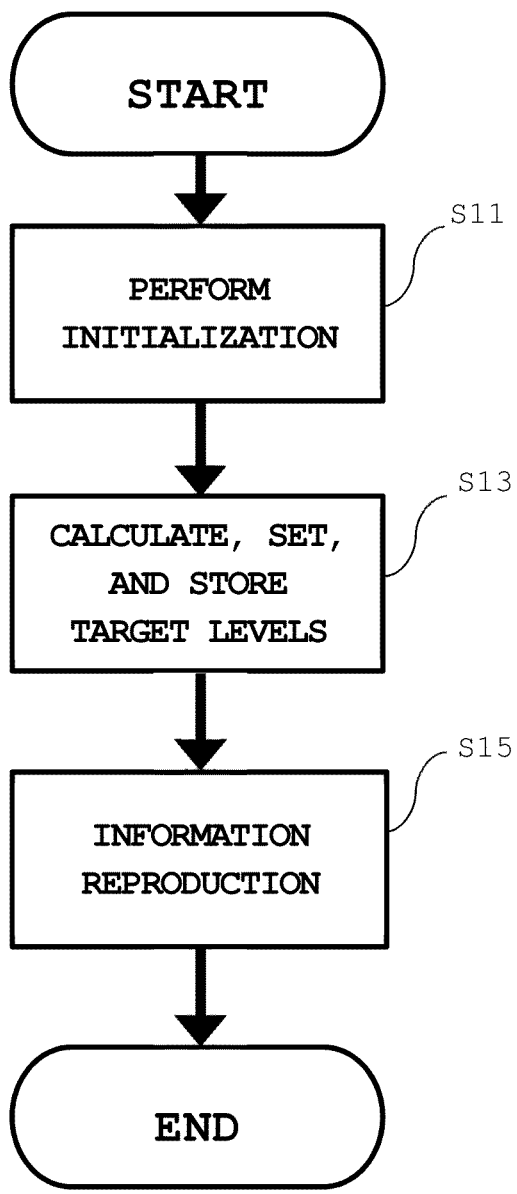
FIG. 9 is a diagram showing a first example of processing in the embodiment of the present invention.

FIG. 8 is a functional block diagram of an optical recording and reproducing system in accordance with the embodiment of the present invention. The optical recording and reproducing system in accordance with the present embodiment includes: an optical unit (PU) 1 that irradiates laser light to an optical information recording medium 15 so as to perform recording or reproduction; a pre-equalizer (Pre-EQ) 3 that performs waveform equalization processing on an electric signal sent from a photodetector included in the optical unit 1 so that the electric signal can be readily converted into a digital signal at the next step; an analog digital converter (hereinafter abbreviated to an ADC) 5 that changes an analog signal into a digital signal; an equalizer 7 that equalizes an amplitude level value of the digital signal, which takes on a peak value at a center position in the length direction of an nT mark and is affected by an adjoining nT space along with a departure from the center position, to any of seven levels ranging from, for example, 0 to 6 despite an imperfect frequency response causing an inter-symbol interference to remain; a Viterbi decoder 9 that decodes a reproduction radiofrequency signal, which is waveform-equalized by the equalizer 7, into the most likely standard symbol sequence; a control unit 11 that performs processing using outputs from the equalizer 7 and Viterbi decoder 9; a recording waveform production unit 13 that produces a recording waveform for Write data according to a setting output sent from the control unit 11, and outputs the recording waveform to the optical unit 1; and a memory 17 in which the results of processing performed by the control unit 11 are stored. The optical recording and reproducing system is connected to a display device and a personal computer, though the display device and personal computer are not shown. In some case, the optical recording and reproducing system may be connected on a network in order to communicate with one computer or plural computers.

The control unit 11 includes: a symbol discrimination block 111 that associates a reproduction radiofrequency signal, which is an output of the equalizer 7, with maximum likelihood decoding code data that is an output of the Viterbi decoder 9; a detection instruction block 113 that instructs detection of an amplitude level when detecting manifestation of a detected pattern, which is pre-set based on code data sent from the symbol discrimination block 111; a detection block 115 that performs detection processing of an amplitude level on the reproduction radiofrequency signal, which is sent from the symbol discrimination block 111, according to an instruction from the detection instruction block 113; a characteristic value detection block 119 that extracts data, which is used to calculate an asymmetry value or a predetermined statistic quantity to be described below, from the reproduction radiofrequency signal that is the output of the equalizer 7; and an operation block 117 that calculates peak levels on the basis of the output from the detection block 115, and performs calculation of plural target levels of a signal, which are employed in maximum likelihood decoding of the aforesaid reproduction signal, and setting of the target levels in the Viterbi decoder 9. The operation block 117 may perform processing according to an output sent from the characteristic value detection block 119. In addition, the operation block 117 may be realized with a combination of, for example, a program, which is used to implement facilities to be described below, and a processor. In this case, the program may be stored in a memory incorporated in the processor.

The present embodiment may be applied to an optical recording and reproducing system that does not have a recording function but has a reproduction function only. In this case, the recording waveform production block 13 is not included.

Next, referring to FIG. 9 to FIG. 18, a concrete example of dynamic setting processing for target levels in the optical recording and reproducing system shown in FIG. 8 will be described below. To begin with, a first example of processing will be presented using FIG. 9. When the optical information recording medium 15 to be involved in reproduction is inserted into the optical recording and reproducing system, the control unit 11 performs predetermined initialization (step S11 in FIG. 9). For example, initial values of target levels are set in the Viterbi decoder 9 or an initial value of a reproduction laser power is set in the optical unit 1.

Figure 3:
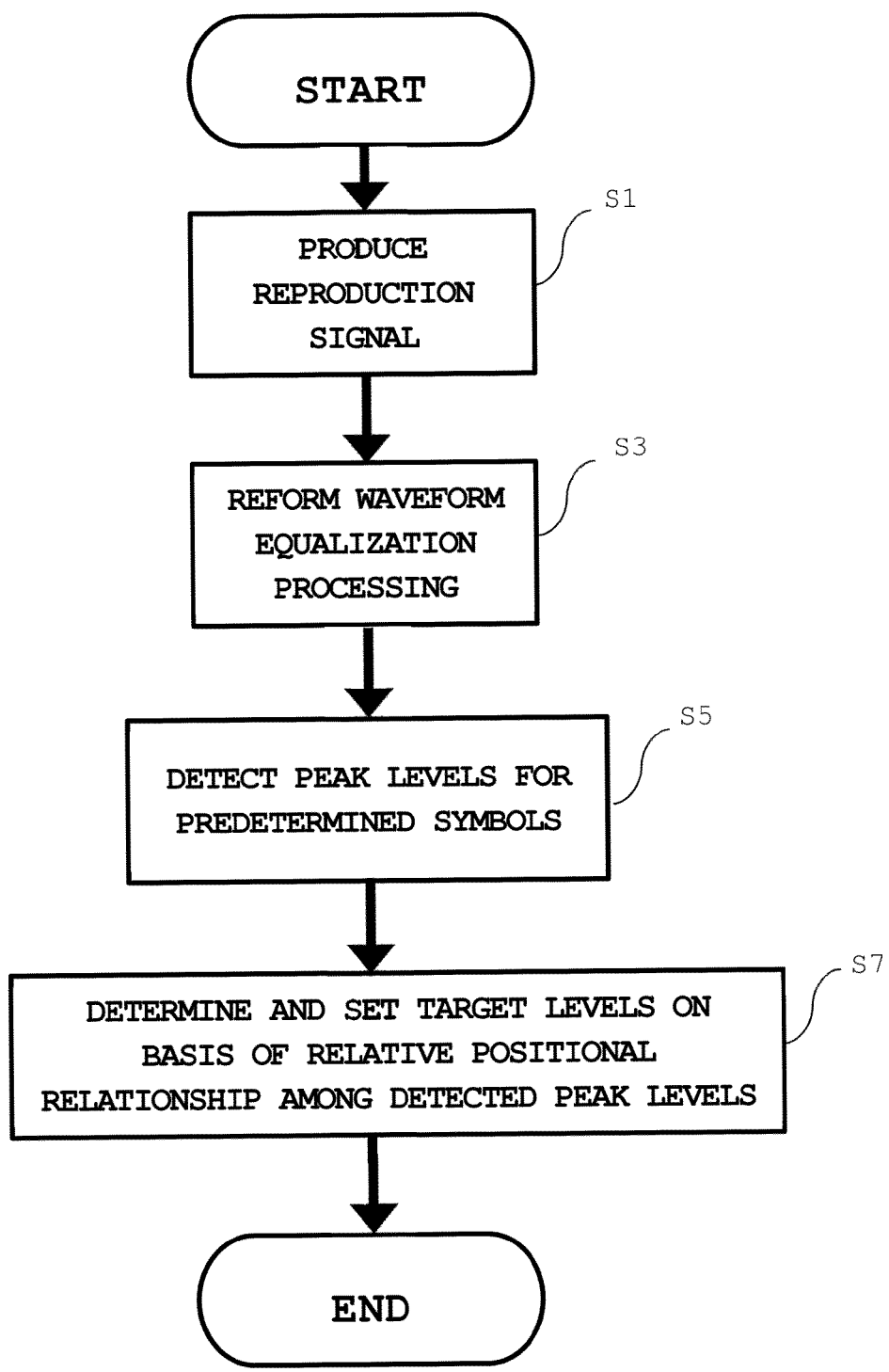
FIG. 3 is a diagram for explaining calculation processing for values of target levels of a signal to be employed in maximum likelihood decoding in an embodiment of the present invention.

When reading information recorded in a lead-in area in the optical information recording medium 15, the operation block 117 performs the processing described in FIG. 3 so as to calculate target levels and set them in the Viterbi decoder 9 (step S13).

More particularly, in the case of the BD standard, the symbol discrimination block 111 associates an output of the equalizer 7 with an output of the Viterbi decoder 9, and outputs the outputs. The detection instruction block 113 detects all of: marks and spaces of plural shortest symbols; marks and spaces of symbols that are the shortest next to the shortest symbols; marks and spaces of third shortest symbols; marks and spaces of at least ones of two kinds of symbols that have a length which is twice or more larger than that of the shortest symbols and that exhibit the highest appearance probabilities relative to a code length causing the an amount of amplitude of the signal to reach a saturated state; and marks and spaces of symbols of 5T or more, respectively, and instructs the detection block 115 to detect peak values. The detection block 115 detects peak values at the timing at which it is instructed, and outputs the detected peak values to the operation block 117. The operation block 117 calculates a respective mean value of peak values corresponding to the marks and spaces of the shortest symbols, a respective mean value of peak values corresponding to the marks and spaces of the symbols that are the shortest next to the shortest symbols, a respective mean value of peak values corresponding to the marks and spaces of the third shortest symbols or a respective mean value of peak values corresponding to the marks and spaces of at least ones of the two kinds of symbols that have a length which is twice or more larger than that of the shortest symbols and that exhibit the highest appearance probabilities relative to a code length causing an amount of amplitude of the signal to reach a saturated state, and a mean value of peak values corresponding to the marks and spaces of the symbols of 5T or more. In addition, the way of calculating the mean value is as mentioned previously. The same applies to a description to be made below.

In the case of the HD DVD standard, the symbol discrimination block 111 associates the output of the equalizer 7 with the output of the Viterbi decoder 9, and outputs the outputs. The detection instruction block 113 detects the marks and spaces of the shortest symbols, the marks and spaces of the symbols that are the shortest next to the shortest symbols, the marks and spaces of the third shortest symbols, the marks and spaces of at least ones of the two kinds of symbols that have a length which is twice or more larger than that of the shortest symbols and that exhibit the highest appearance probabilities relative to a code length causing an amount of amplitude of the signal to reach a saturated state, and the marks and spaces of the symbols of 5T or more, and instructs the detection block 115 to detect peak values. The detection block 115 detects the peak values at the timing at which it is instructed, and outputs the detected values to the operation block 117. The operation block 117 calculates a respective mean value of the peak values corresponding to the marks and spaces of the shortest symbols, a respective mean value of the peaks values corresponding to the marks and spaces of the symbols that are the shortest next to the shortest symbols, a respective mean value of the peaks corresponding to the marks and spaces of the third shortest symbols, a respective mean value of the peak values corresponding to the marks and spaces of at least ones of the two kinds of symbols that have a length which is twice or more larger than that of the shortest symbols and that exhibit the highest appearance probabilities relative to a code length causing an amount of amplitude of the signal to reach a saturated state, and a mean value of the peak values corresponding to the marks and spaces of the symbols of 5T or more.

The operation block 117 determines, as described in conjunction with FIG. 3, target levels on the basis of the relative positional relationship among the detected peak levels, and sets the target levels in the Viterbi decoder 9. The calculated values of the target levels may be stored in the memory 17 while being associated with a medium ID of the optical information recording medium 15. This is intended to read and utilize the values of the target levels at the time of reproducing an optical information recording medium having the same medium ID.

Thereafter, the optical recording and reproducing system reproduces information recorded in the optical information recording medium 15 (step S15).

As mentioned above, if setting the target level values is completed prior to reproduction of information, the information reproduction can be begun with a symbol error rate held low.

Next, referring to FIG. 8, a second example of processing of the optical recording and reproducing system will be presented below. When the optical information recording medium 15 is inserted into the optical recording and reproducing system, the control unit 11 performs predetermined initialization (step S21 in FIG. 10). For example, initial values of target levels are set in the Viterbi decoder 9, and an initial value of a reproduction laser power is set in the optical unit 1.

The optical recording and reproducing system reproduces information recorded in the optical information recording medium 15 (step S23). For example, reproduction is performed for a predetermined period of time or on a predetermined amount of data. During the reproduction of step S23, peak levels are detected. Thereafter, the operation block 117 uses, similarly to step S13, the results of the reproduction performed at step S23 to calculate values of target levels, and sets the values in the Viterbi decoder 9, and stores the values of the target levels together with the medium ID of the optical information recording medium 15 in the memory 17 (step S25).

Thereafter, based on the setting of step S25, the optical recording and reproducing system reproduces remaining information recorded in the optical information recording medium (step S27).

As mentioned above, if the target levels are set after reproduction of part of information, the target levels depending on the recording state of the optical information recording medium 15 can be set. A symbol error rate can be further decreased.

Figure 10:
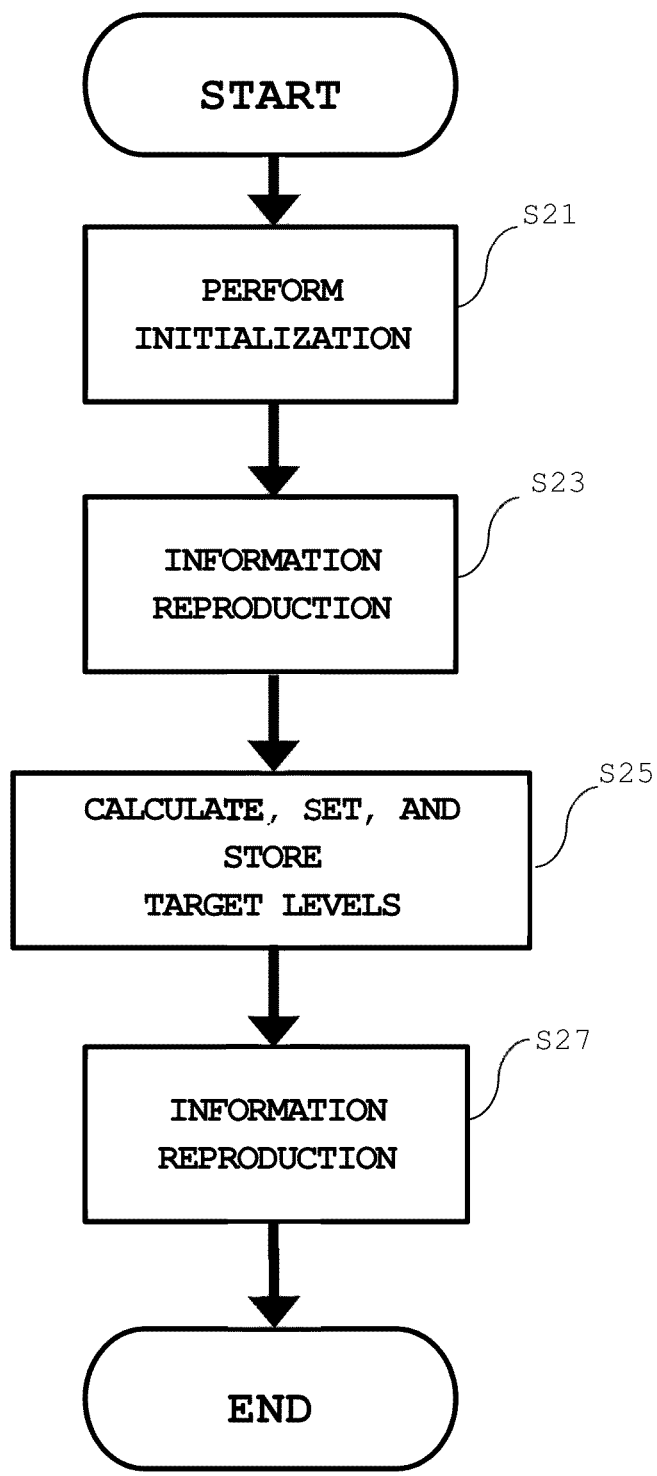
FIG. 10 is a diagram showing a second example of processing in the embodiment of the present invention.

Referring to FIG. 10, a third example of processing of the optical recording and reproducing system will be presented below. When the optical information recording medium 15 is inserted into the optical recording and reproducing system, the control unit 11 performs predetermined initialization (step S31 in FIG. 10). For example, initial values of target levels are set in the Viterbi decoder 9, and an initial value of a reproduction laser power is set in the optical unit 1.

The optical recording and reproducing system reproduces information recorded in the optical information recording medium 15 (step S33). For example, the reproduction is performed for a predetermined period of time or on a predetermined amount of data. An amount of reproduction may be defined with the number of rotations. During the reproduction of step S33, peak levels are detected.

If reproduction termination is instructed by a user, or anyhow, reproduction termination is recognized (Yes route at step S35), processing is terminated. In contrast, if the reproduction termination is not instructed (No route at step S35), the operation block 117 decides whether correction timing has come (step S37). As mentioned above, whether a predetermined period of time has elapsed, a predetermined amount of data has been reproduced, or a predetermined reproduction position has come is decided. If the correction timing has not come, the processing is returned to step S33. In contrast, if a decision is made that the correction timing has come, the operation block 117 uses, similarly to step S13, the results of the reproduction performed at step S33 to calculate values of target levels, and sets the values in the Viterbi decoder 9 (step S39). Based on the setting of step S39, the optical recording and reproducing system gets back to step S33 so as to reproduce information recorded in the optical information recording medium 15.

As mentioned above, since target levels are set regularly, partially different target levels may be set for reproduction of information from the optical information recording medium 15. Anyhow, the target levels can be adaptively set. Incidentally, setting the target levels may not be exactly regularly performed.

Next, referring to FIG. 11, a fourth example of processing of the optical recording and reproducing system will be presented below. When the optical information recording medium 15 to be involved in reproduction is inserted to the optical recording and reproducing system, the control unit 11 performs predetermined initialization (step S41 in FIG. 11). For example, initial values of target levels are set in the Viterbi decoder 9, and an initial value of a reproduction laser power is set in the optical unit 1.

The optical recording and reproducing system reproduces information recorded in the optical information recording medium 15 (step S43). For example, the reproduction is performed for a predetermined period of time or on a predetermined amount of data. An amount of reproduction may be defined with the number of rotations. During the reproduction of step S43, peak levels are detected.

If reproduction termination is instructed by a user, or anyhow, reproduction termination is recognized (Yes route at step S45), processing is terminated. If the reproduction termination is not instructed (No route at step S45), the operation block 117 evaluates the signal state of a reproduction signal (step S47).

The signal state of a reproduction signal is evaluated based on, for example, a symbol error rate, a jitter value, or a value of asymmetry. What is referred to as the value of asymmetry is an index value that is calculated using amplitude levels for a predetermined symbol and indicates the symmetry between symbols (hereinafter, an asymmetry value). More particularly, a deviation value of a center position between amplitude levels representing the mark and space of a symbol is calculated as the asymmetry value according to a predetermined expression. The signal state may be evaluated based on an evaluation index value such as a value of β (hereinafter, a β value). Such an evaluation index value is calculated from a value, which is detected by the characteristic value detection block 119, by the operation block 117. The evaluation index value is already known, and the calculation method is also already known. An iterative description will be omitted.

Figure 13:
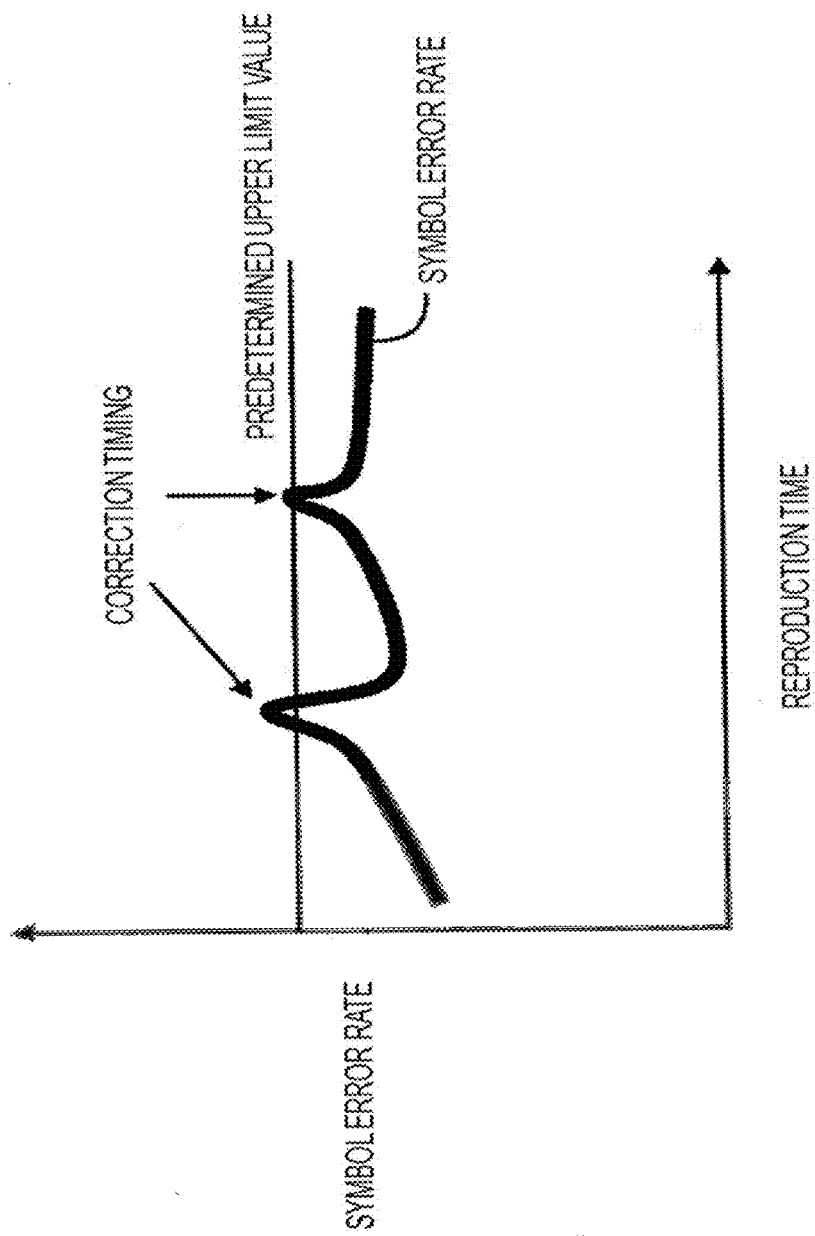
FIG. 13 is a diagram for explaining correction timing in a case where a symbol error rate is regarded as an evaluation index value for a signal state.
Figure 14:
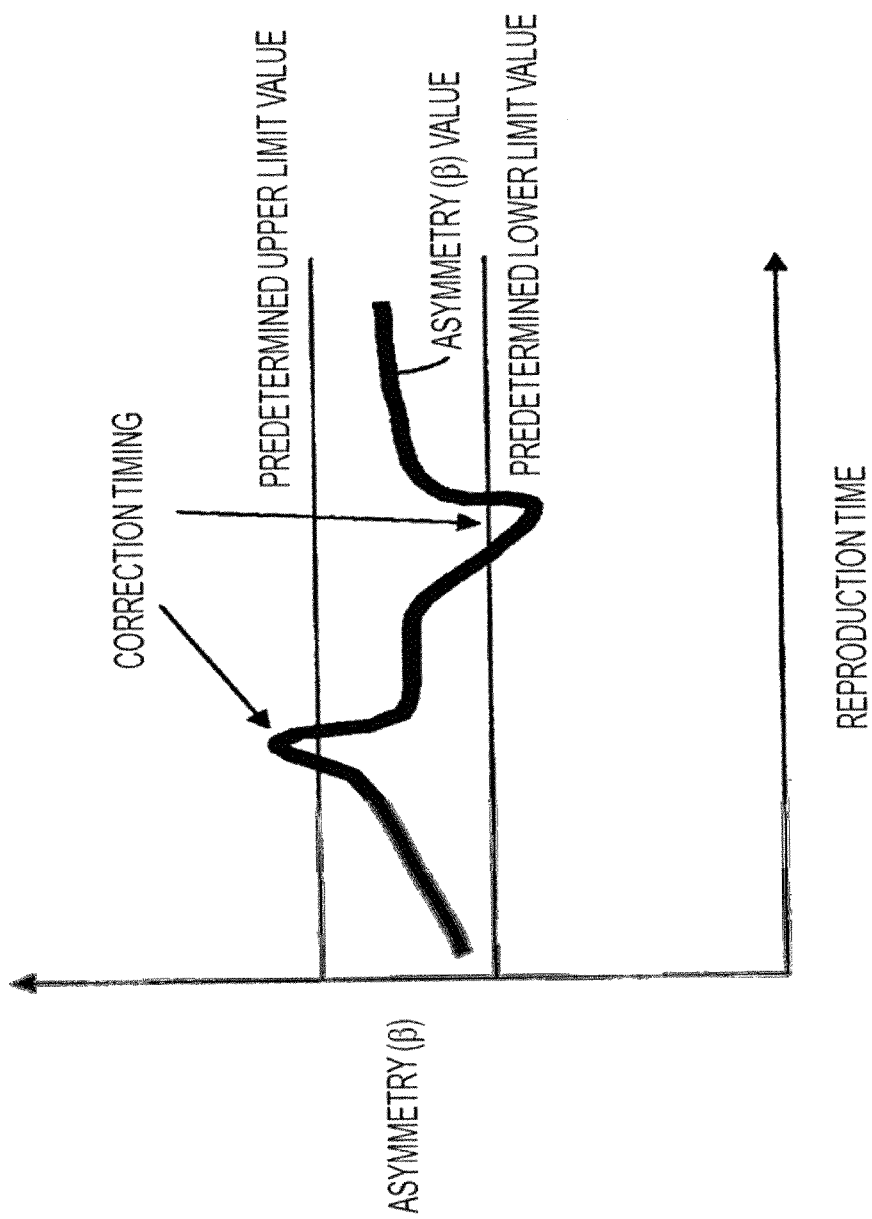
FIG. 14 is a diagram for explaining the correction timing in a case where an asymmetry value or a β value is regarded as the evaluation index value for a signal state.

The operation block 117 decides based on the signal state of a reproduction signal whether correction of target levels is necessary (step S49). For example, in the case of a symbol error rate, as shown in FIG. 13, whether the symbol error rate varies with the passage of time and reaches a predetermined upper limit value is decided. Specifically, part exceeding a predetermined upper limit shown in FIG. 13 indicates the correction timing. Similarly, in the case of an asymmetry value or β value, as shown in FIG. 14, whether the asymmetry value or β value falls outside a permissible range defined with a predetermined upper or lower limit value is decided. Specifically, as shown in FIG. 14, the timing at which the asymmetry value or β value exceeds the upper limit value or falls below the lower limit value is the correction timing.

If a decision is made at step S49 that correction is unnecessary, the processing returns to step S43. In contrast, if a decision is made that the correction is necessary, the operation block 117 uses, similarly to step S13, the results of the reproduction performed at step S43 to calculate target level values of a signal to be employed in decoding the reproduction equalization signal, and sets the target level values in the Viterbi decoder 9 (step S51). Based on the setting of step S51, the optical recording and reproducing system gets back to step S43 so as to reproduce information recorded in the optical information recording medium 15.

As mentioned above, if the signal state of a reproduction signal deteriorates, target levels are set accordingly. Therefore, reproduction of the optical information recording medium 15 can be continued without a rise in a symbol error rate during the reproduction. Since step S51 is performed if necessary, a processing load on the operation block 117 is reduced.

Next, referring to FIG. 15, a fifth example of processing of the optical recording and reproducing system will be presented below. In the present example of processing, values of target levels that should be set in the Viterbi decoder 9 shall be registered in association with the medium ID. The values of target levels have already, as mentioned above, been optimized for each optical information recording medium.

Figure 15:
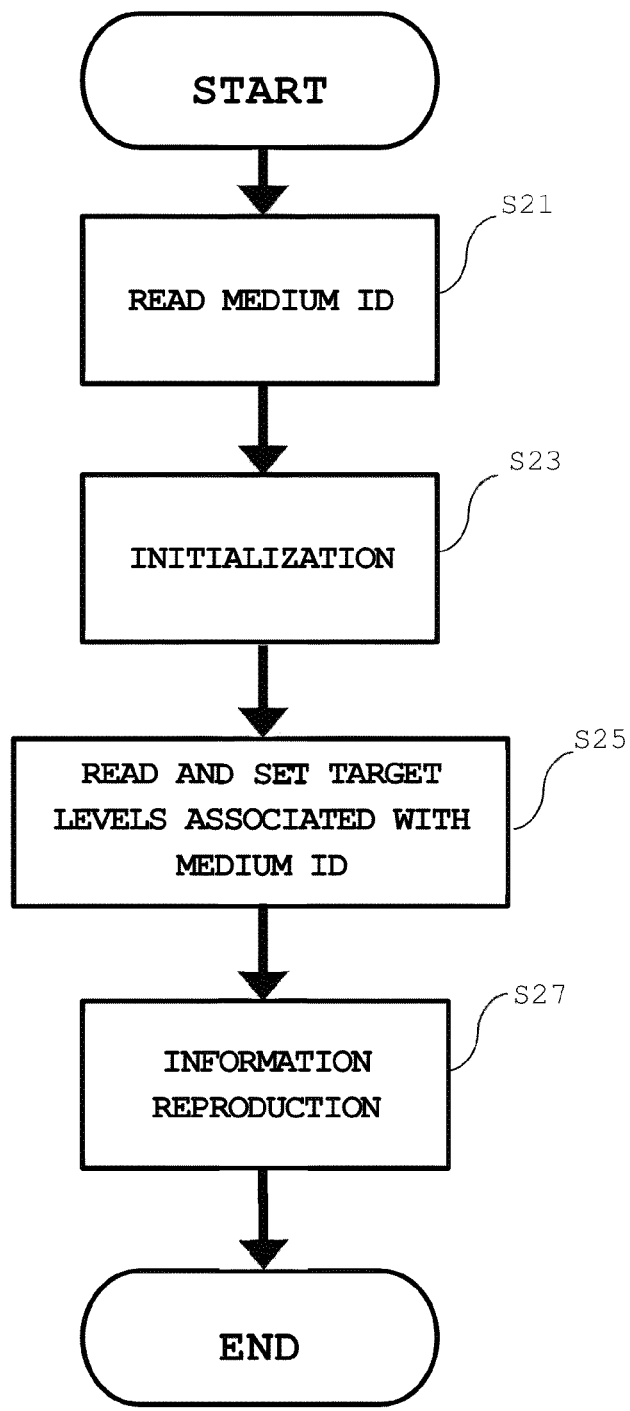
FIG. 15 is a diagram showing a fifth example of processing in the embodiment of the present invention.

First, when the optical information recording medium 15 to be involved in reproduction is inserted into the optical recording and reproducing system, the control unit 11 reads the medium ID recoded in a predetermined area in the optical information recording medium 15 (step S61 in FIG. 15). Predetermined initialization is then performed in association with the medium ID (step S63). For example, an initial value of a reproduction laser power is set in the optical unit 1.

Further, the control unit 11 reads the values of the target levels associated with the medium ID read at step S61 from among values of target levels stored in the memory 17, and sets the target level values in the Viterbi decoder 9 (step S65).

The optical recording and reproducing system reproduces information recorded in the optical information recording medium 15 for a user (step S67).

In this manner, reproduction can be achieved with a symbol error rate held low without the necessity of performing the aforesaid calculation processing for target level values in the optical recording and reproducing system. Incidentally, the target level value may be registered in the memory 17 by a manufacturer of the optical recording and reproducing system. As presented in FIG. 9 or FIG. 10, every time calculation processing for values of target levels is carried out, data may be accumulated in the memory 17 for later use.

Further, referring to FIG. 14, a sixth example of processing of the optical recording and reproducing system will be presented below. Even in the present example of processing, values of target levels that should be set in the Viterbi decoder 9 shall be registered in association with a medium ID in the memory 17. The values of the target levels have, as mentioned above, already been optimized for each optical information recording medium.

Figure 16:
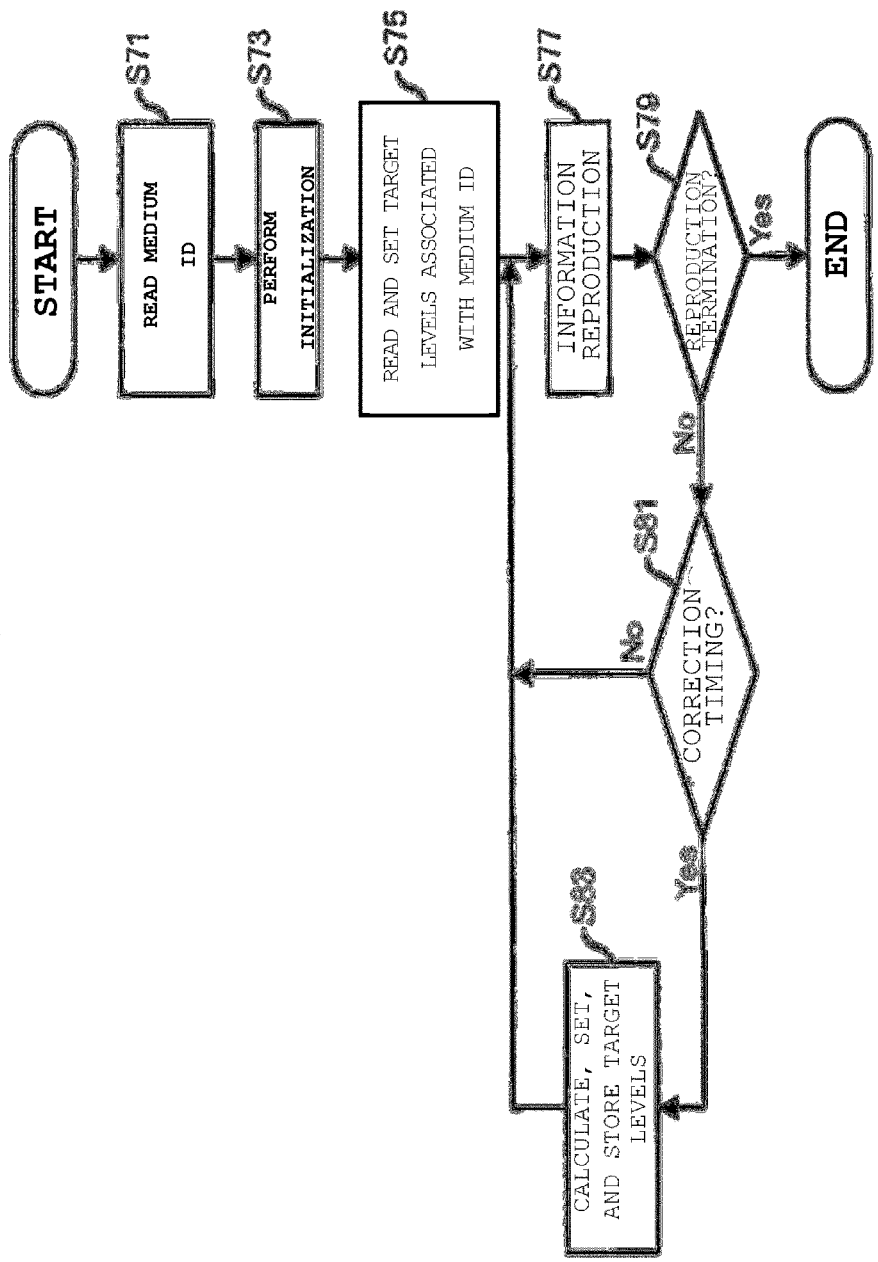
FIG. 16 is a diagram showing a sixth example of processing in the embodiment of the present invention.
Figure 17:
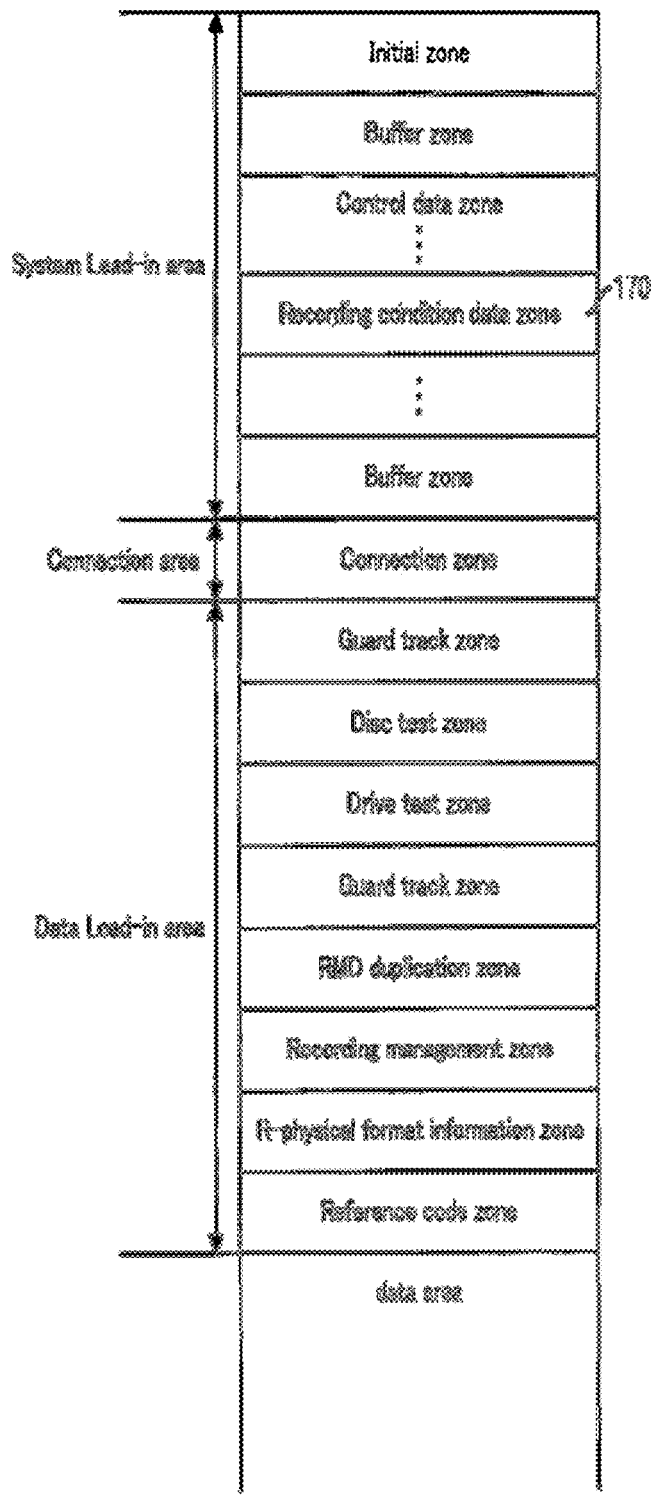
FIG. 17 is a diagram showing a data structure of data to be recorded in an optical information recording medium.

First, when the optical information recording medium 15 is inserted into the optical recording and reproducing system, the control unit 11 reads the medium ID recorded in a predetermined area in the optical information recording medium 15 (step S71 in FIG. 16). Predetermined initialization is then performed in association with the medium ID (step S73). For example, an initial value of a reproduction laser power is set in the optical unit 1.

Further, the control unit 11 reads the values of the target levels associated with the medium ID read at step S71 from among values of target levels stored in the memory 17, and sets the target level values in the Viterbi decoder 9 (step S75).

The optical recording and reproducing system reproduces information recorded in the optical information recording medium 15 (step S77). For example, the reproduction is performed for a predetermined period of time or on a predetermined amount of data. An amount of reproduction may be defined with the number of rotations. During the reproduction of step S77, peak levels are detected.

If reproduction termination is instructed by a user, or anyhow, if reproduction termination is recognized (Yes route at step S79), processing is terminated. If the reproduction termination is not instructed (No route at step S79), the operation block 117 decides whether correction timing has come (step S81). As mentioned above, whether a predetermined period of time has elapsed, a predetermined amount of data has been reproduced, or a predetermined reproduction position has come is decided. If the correction timing has not come, the processing returns to step S77. In contrast, if a decision is made that the correction timing has come, the operation block 117 uses, similarly to step S13, the results of the reproduction performed at step S77 to calculate values of target levels, and sets the values in the Viterbi decoder 9 (step S83). Further, the calculated values of the target levels are stored in association with the medium ID in the memory 17. Based on the setting of step S83, the optical recording and reproducing system gets back to step S77 so as to reproduce information recorded in the optical information recording medium 15.

As mentioned above, target levels prepared in advance are initially set, and the target levels are regularly set. Therefore, the target levels can be adaptively set, for example, the target levels that vary depending on an arbitrary part of a recording portion of the optical information recording medium 15 can be set. In other words, a symbol error rate can be decreased over entire reproduction. Incidentally, setting the target levels may not be exactly regularly performed.

Figure 11:
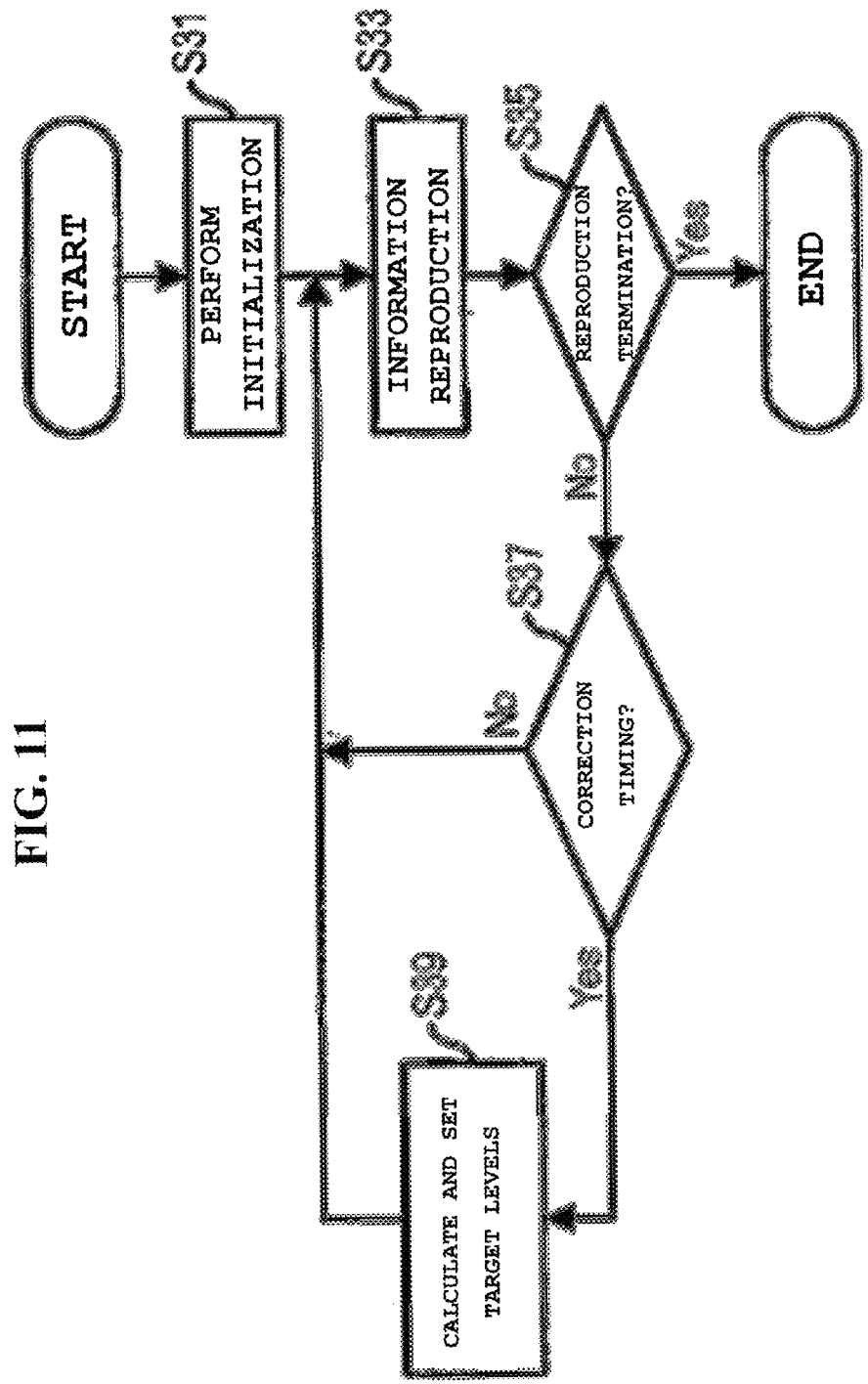
FIG. 11 is a diagram showing a third example of processing in the embodiment of the present invention.

In the present example of processing, an example of a combination of the pieces of processing presented in FIG. 11 and FIG. 15 is taken. Alternatively, the pieces of processing presented in FIG. 12 and FIG. 15 may be combined.

In the foregoing example of processing, an example in which values of target levels are stored in the memory 17 is taken. However, the values of the target levels may not necessarily be preserved in the memory 17. For example, the values of the target levels may be preserved in the optical information recording medium 15. When the target level values are preserved in the optical information recording medium 15, they are preserved in a lead-in area shown in FIG. 17. The lead-in area is broadly divided into a system lead-in area, a connection area, and a data lead-in area. The system lead-in area includes an initial zone, a buffer zone, a control data zone, and a buffer zone. The connection area includes a connection zone. Further, the data lead-in area includes a guard track zone, a disk test zone, a drive test zone, a guard track zone, an RMD duplication zone, a recording management zone, an R-physical format information zone, and a reference code zone. In the present embodiment, the control data zone of the system lead-in area includes a recording condition data zone 170.

For example, in the recording condition data zone 170, values of target levels for the optical information recording medium 15 are preserved, and read when needed.

As mentioned above, since the values of the target levels for the optical information recording medium 15 are preserved in the optical information recording medium 15, reproduction can be performed at a low symbol error rate in any optical recording and reproducing system from the beginning.

Figure 18:
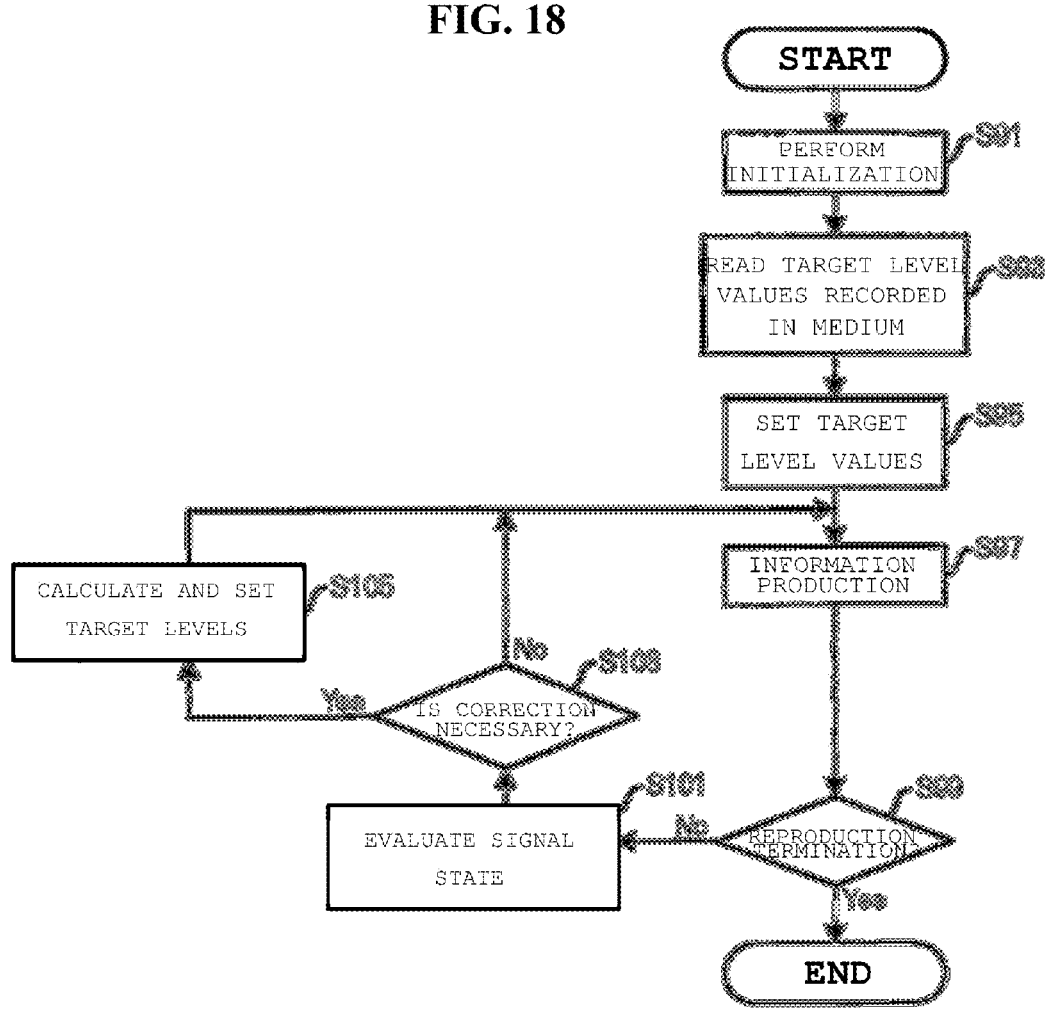
FIG. 18 is a diagram showing a seventh example of processing in the embodiment of the present invention.

Further, referring to FIG. 18, an example of processing to be performed in a case where target level values are recorded in the optical information recording medium 15 will be presented below. First, when the optical information recording medium 15 to be involved in reproduction is inserted into the optical recording and reproducing system, the control unit 11 performs predetermined initialization (step S91 in FIG. 18). For example, an initial value of a reproduction laser power is set in the optical unit 1.

The control unit 11 then reads the values of the target levels, which are recorded in the optical information recording medium 15, from the optical information recording medium 15 (step S93). The read values of the target levels are set in the Viterbi decoder 9 (step S95).

Thereafter, information recorded in the optical information recording medium 15 is reproduced (step S97). For example, the reproduction is performed for a predetermined period of time or on a predetermined amount of data. An amount of reproduction may be defined with the number of rotations. During the reproduction of step S97, peak levels are detected.

If reproduction termination is instructed by a user, or anyhow, if reproduction termination is recognized (Yes route at step S99), processing is terminated. In contrast, if the reproduction termination is not instructed (No route at step S99), the operation block 117 evaluates the signal state of a reproduction signal (step S101). The evaluation of the signal state of the reproduction signal is identical to that of step S47.

The operation block 117 then decides based on the signal state of the reproduction signal whether correction of target levels is necessary (step S103). The decision to be made at this step is identical to that of step S49.

If a decision is made at step S103 that correction is unnecessary, the processing returns to step S97. In contrast, if a decision is made that the correction is necessary, the operation block 117 uses, similarly to step S13, the results of the reproduction performed at step S97 to calculate target level values, and sets the target level values in the Viterbi decoder 9 (step S105). Based on the setting of step S105, the optical recording and reproducing system gets back to step S97 so as to reproduce information recorded in the optical information recording medium 15.

As mentioned above, initially, values of target levels recorded in the optical information recording medium 15 are set, and reproduction is begun. If the signal state of a reproduction signal deteriorates, the target levels are set accordingly. Therefore, the reproduction from the optical information recording medium 15 can be continued without a rise in a symbol error rate during the reproduction. In addition, since step S105 is carried out if necessary, a processing load on the operation block 117 is reduced.

Figure 12:
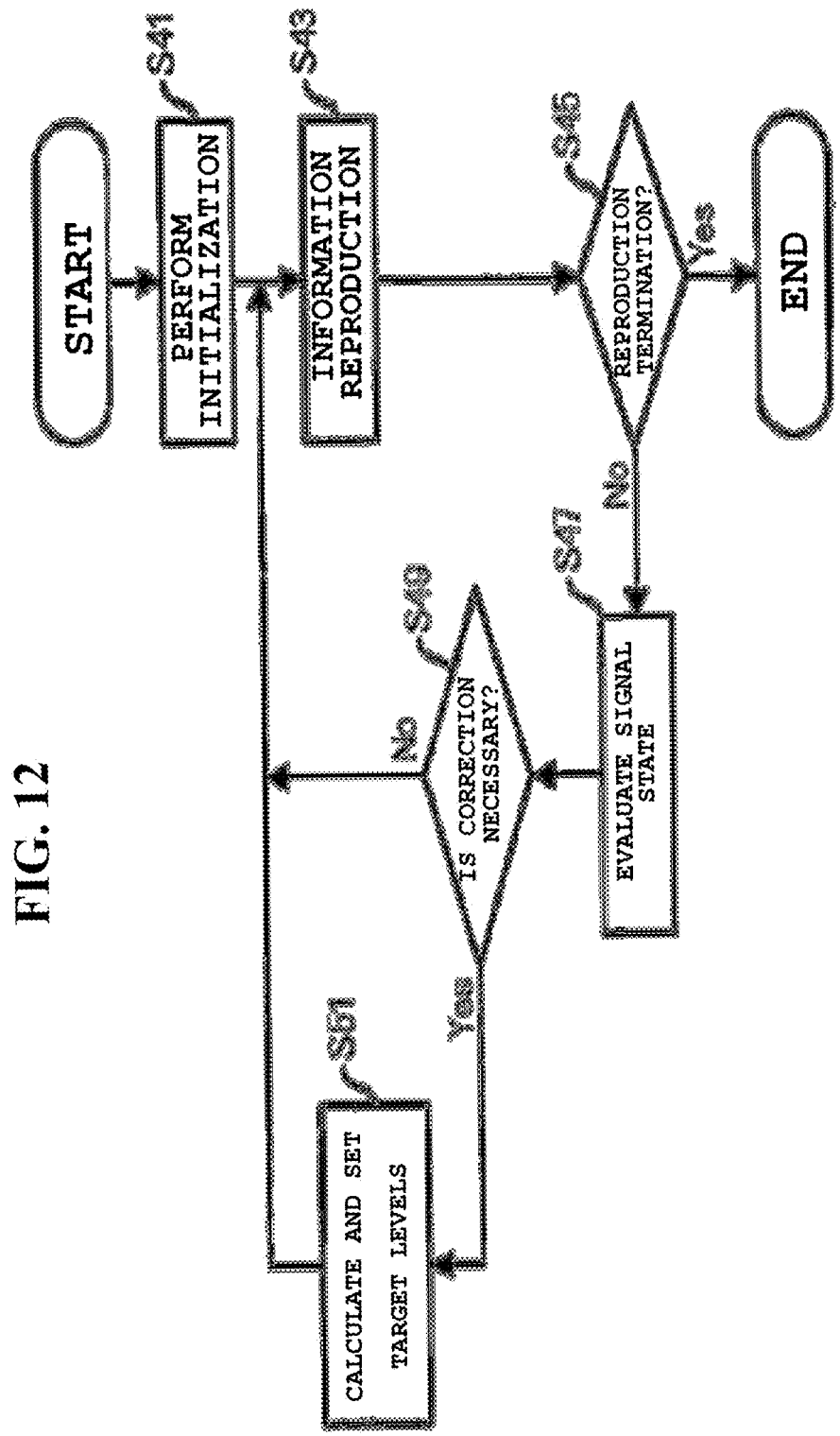
FIG. 12 is a diagram showing a fourth example of processing in the embodiment of the present invention.

Herein, the processing presented in FIG. 12 is applied to a case where values of target levels are recorded in the optical information recording medium 15. Alternatively, the processing presented in FIG. 11 may be applied.

The embodiment of the present invention has been described so far. The present invention is not limited to the embodiment. The functional block diagram shown in FIG. 8 is a mere example but may not necessarily correspond to actual circuitry.

In the aforesaid examples, all target levels are described to be re-set. Alternatively, a part of the target levels may be re-set and still achieve the effect of reducing the error rate.

The invention claimed is:

1. A method of setting a target level of a signal to be employed in maximum likelihood decoding in PRML processing of a reproduction signal of an optical information recording medium, comprising:
   a step of producing a reproduction signal from reflected light of laser light irradiated to an optical information recording medium;
   a step of performing waveform equalization processing, which depends on a predetermined partial response characteristic, on the reproduction signal to produce a waveform-equalized reproduction equalization signal;
   a step of detecting values of peak levels of a mark and a space of a shortest symbol and marks and spaces of symbols of 5T or more, respectively, from the reproduction equalization signal irrespective of a condition for a symbol adjoining the symbol; and
   a setting step including:
      selecting a symbol of 5T or more that has a mark peak level attaining a maximum value among said symbols of 5T or more when a low-to-high recording method has been used in the optical information recording medium, or selecting a symbol of 5T or more that has a mark peak level attaining a minimum value among said symbols of 5T or more when a high-to-low recording method has been used in the optical information recording medium,
      normalizing the respective peak levels of the mark and the space of the shortest symbol in accordance with the peak levels of the mark and the space of the selected symbol of 5T or more, and
      determining and setting a value of a center level of a plurality of target levels used in Viterbi decoding in accordance with an intermediate level between the normalized peak level of the mark and the normalized peak level of the space of the shortest symbol.

2. The method according to claim 1, wherein the setting step further includes determining and setting values of target levels that are one level above and below and that are respectively the closest to the center level of the plurality of target levels used in Viterbi decoding in accordance with the normalized peak levels of the mark and the space of the shortest symbol.

3. The method according to claim 2,
   wherein the step of detecting further includes detecting respective peak levels of a mark and a space of a second shortest symbol from the reproduction equalization signal, and
   wherein the setting step further includes:
      normalizing the respective peak levels of the mark and the space of the second shortest symbol in accordance with the peak levels of the mark and the space of the selected symbol of 5T or more, and
      determining and setting values of target levels that are the second closest to, and are above and below, the center level of the plurality of target levels used in Viterbi decoding in accordance with the normalized peak levels of the mark and the space of the second shortest symbol.

4. The method according to claim 3,
   wherein the step of detecting further includes detecting respective peak levels of a mark and a space of a third shortest symbol from the reproduction equalization signal, and
   wherein the setting step further includes:
      normalizing the respective peak levels of the mark and the space of the third shortest symbol in accordance with the peak levels of the mark and the space of the selected symbol of 5T or more, and
      determining and setting values of target levels that are the third closest to, and are above and below, the center level of the plurality of target levels used in Viterbi decoding in accordance with the normalized peak levels of the mark and the space of the third shortest symbol.

5. The target level setting method as set forth in claim 3 or 4, wherein the step of detecting detects, from the reproduction equalization signal, respective peak levels of a mark and a space of at least one of two symbols that exhibit the top two highest probabilities of occurrence among symbols having a length which is twice or more larger than that of the shortest symbol, and
   wherein the setting step further includes setting the respective peak levels of said at least one of the two symbols that exhibit the top two highest probabilities of occurrence as a maximum level and a minimum level, respectively, of the plurality of target levels used in Viterbi decoding.

6. The method of setting target levels as set forth in any one of claims 1 to 4, wherein the peak level is a mean value of a plurality of peak values of the waveform-equalized reproduction equalization signal corresponding to marks or spaces of identical symbols.

7. The method of setting a target level as set forth in any one of claims 1 to 4, wherein:
   in a case where decoding processing is performed using a partial response (1,2,2,1), the target levels are seven levels of non-equal intervals ranging from a minimum value of 0 to a maximum value of 6; and
   in a case where decoding processing is performed using a partial response (1,2,2,2,1), the target levels are nine levels of non-equal intervals ranging from a minimum value of 0 to a maximum value of 8.

8. An optical information recording medium processor that sets a target level of a signal to be employed in maximum likelihood decoding in PRML processing of a reproduction signal of an optical information recording medium, comprising:
   a means for producing a reproduction signal from reflected light of laser light irradiated to an optical information recording medium;
   a means for performing waveform equalization processing, which depends on a predetermined partial response characteristic, on the reproduction signal to produce a waveform-equalized reproduction equalization signal;
   a means for detecting values of peak levels of a mark and a space of a shortest symbol and marks and spaces of symbols of 5T or more, respectively, from the reproduction equalization signal irrespective of a condition for a symbol adjoining the symbol; and
   a setting means for:
      selecting a symbol of 5T or more that has a mark peak level attaining a maximum value among said symbols of 5T or more when a low-to-high recording method has been used in the optical information recording medium, or selecting a symbol of 5T or more that has a mark peak level attaining a minimum value among said symbols of 5T or more when a high-to-low recording method has been used in the optical information recording medium,
      normalizing the respective peak levels of the mark and the space of the shortest symbol in accordance with the peak levels of the mark and the space of the selected symbol of 5T or more, and
      determining and setting a value of a center level of a plurality of target levels used in Viterbi decoding in accordance with an intermediate level between the normalized peak level of the mark and the normalized peak level of the space of the shortest symbol.

9. The optical information recording medium processor according to claim 8, wherein the setting means further determines and sets values of target levels that are one level above and below and that are respectively the closest to the center level of the plurality of target levels used in Viterbi decoding in accordance with the normalized peak levels of the mark and the space of the shortest symbol.

10. The optical information recording medium processor according to claim 9,
   wherein the means for detecting further detects respective peak levels of a mark and a space of a second shortest symbol from the reproduction equalization signal, and
   wherein the setting means further performs:
      normalizing the respective peak levels of the mark and the space of the second shortest symbol in accordance with the peak levels of the mark and the space of the selected symbol of 5T or more, and
      determining and setting values of target levels that are the second closest to, and are above and below, the center level of the plurality of target levels used in Viterbi decoding in accordance with the normalized peak levels of the mark and the space of the second shortest symbol.

11. The optical information recording medium processor according to claim 10,
   wherein the means for detecting further detects respective peak levels of a mark and a space of a third shortest symbol from the reproduction equalization signal, and
   wherein the setting means further performs:
      normalizing the respective peak levels of the mark and the space of the third shortest symbol in accordance with the peak levels of the mark and the space of the selected symbol of 5T or more, and
      determining and setting values of target levels that are the third closest to, and are above and below, the center level of the plurality of target levels used in Viterbi decoding in accordance with the normalized peak levels of the mark and the space of the third shortest symbol.

12. The optical information recording medium processor as set forth in claim 10 or 11, wherein means for detecting detects, from the reproduction equalization signal, respective peak levels of a mark and a space of at least one of two symbols that exhibit the top two highest probabilities of occurrence among symbols having a length which is twice or more larger than that of the shortest symbol, and
   wherein the setting means further includes sets the respective peak levels of said at least one of the two symbols that exhibit the top two highest probabilities of occurrence as a maximum level and a minimum level, respectively, of the plurality of target levels used in Viterbi decoding.

13. The optical information recording medium processor as set forth in any one of claims 8 to 11, wherein the peak level is a mean value of a plurality of peak values of the waveform-equalized reproduction equalization signal corresponding to marks or spaces of identical symbols.

14. The optical information recording medium processor as set forth in any one of claims 8 to 11, wherein:
   in a case where decoding processing is performed using a partial response (1,2,2,1), the target levels are seven levels of non-equal intervals ranging from a minimum value of 0 to a maximum value of 6; and
   in a case where decoding processing is performed using a partial response (1,2,2,2,1), the target levels are nine levels of non-equal intervals ranging from a minimum value of 0 to a maximum value of 8.

* * * * *